US012517682B2

(12) United States Patent
Desanti et al.

(10) Patent No.: US 12,517,682 B2
(45) Date of Patent: *Jan. 6, 2026

(54) STORAGE SUBSYSTEM-DRIVEN ZONING IN A NON-VOLATILE MEMORY EXPRESS ENVIRONMENT

(71) Applicant: DELL PRODUCTS L.P., Round Rock, TX (US)

(72) Inventors: Claudio Desanti, Santa Cruz, CA (US); David Black, Acton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/786,533

(22) Filed: Jul. 28, 2024

(65) Prior Publication Data

US 2024/0385779 A1    Nov. 21, 2024

Related U.S. Application Data

(63) Continuation of application No. 17/699,005, filed on Mar. 18, 2022, now Pat. No. 12,105,989.

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/067* (2013.01)

(58) Field of Classification Search
CPC .... G06F 3/0659; G06F 3/0604; G06F 3/0635; G06F 3/067; H04L 63/0209; H04L 63/102; H04L 67/1097; H04L 41/0893

USPC ................................................ 711/154, 100
See application file for complete search history.

(56) References Cited

U.S. PATENT DOCUMENTS

| | | |
|---|---|---|
| 6,625,625 B1 | 9/2003 | Kihara et al. |
| 7,185,334 B2 | 2/2007 | Bourke-Dunphy et al. |
| 7,697,920 B1 | 4/2010 | Mcclain |
| 8,375,014 B1 | 2/2013 | Brocato et al. |

(Continued)

OTHER PUBLICATIONS

"FC and FCOE versus iSCSI—"Network-centric" versus "End-Node-centric" provisioning," [online], [Retrieved Oct. 12, 2020]. Retrieved from Internet (6pgs).

(Continued)

*Primary Examiner* — Hosain T Alam
*Assistant Examiner* — Zubair Ahmed
(74) *Attorney, Agent, or Firm* — BAUGH LAW, LLC

(57) ABSTRACT

Embodiments presented herein solve issues related to non-volatile memory express (NVMe®) protocol differences from other protocols, such as Fibre Channel Common Transport, which is the protocol used for Zoning management in Fibre Channel. Fibre Channel Common Transport supports bidirectional transfers of data. However, NVMe® commands support transfer of data either with the command (e.g., host-to-controller data transfer (e.g., a "write" operation)) or with the response (e.g., controller-to-host data transfer (e.g., a "read" operation)), but not both creates a problem related to zoning in NVMe® networks. Furthermore, data size limits for submission queue entries and completion queue entries for NVMe® commands add other obstacles. Embodiments herein address these limitations.

20 Claims, 26 Drawing Sheets

(56) References Cited

U.S. PATENT DOCUMENTS

| | | |
|---|---|---|
| 9,384,093 B1 | 7/2016 | Aiello |
| 9,516,108 B1 | 12/2016 | Sullivan et al. |
| 10,225,138 B2 | 3/2019 | Wu et al. |
| 10,372,926 B1 | 8/2019 | Leshinsky et al. |
| 10,445,229 B1 | 10/2019 | Kuzmin et al. |
| 10,771,340 B2 | 9/2020 | Ballapuram |
| 10,877,669 B1 | 12/2020 | Sivasubramanian et al. |
| 11,237,997 B2 | 2/2022 | Smith et al. |
| 11,323,355 B1 | 5/2022 | Gupta et al. |
| 11,442,652 B1 | 9/2022 | Dailey et al. |
| 11,451,470 B2 | 9/2022 | Power et al. |
| 11,487,690 B2 | 11/2022 | Puttagunta et al. |
| 11,489,723 B2 | 11/2022 | Smith et al. |
| 11,520,518 B2 | 12/2022 | Desanti et al. |
| 11,526,283 B1 | 12/2022 | Mallick et al. |
| 11,543,966 B1 | 1/2023 | Varghese et al. |
| 11,550,734 B1 | 1/2023 | Matosevich et al. |
| 11,579,808 B2 | 2/2023 | Satapathy et al. |
| 11,588,261 B2 | 2/2023 | Olarig et al. |
| 11,614,970 B2 | 3/2023 | Huang et al. |
| 11,625,273 B1 | 4/2023 | Elhemali et al. |
| 11,640,245 B2 | 5/2023 | Rao et al. |
| 11,651,066 B2 | 5/2023 | Levi et al. |
| 11,675,499 B2 | 6/2023 | Dhatchinamoorthy et al. |
| 11,782,611 B2 | 10/2023 | Shachar et al. |
| 11,805,171 B2 | 10/2023 | Smith et al. |
| 11,818,031 B2 | 11/2023 | Smith et al. |
| 11,822,545 B2 | 11/2023 | Cappiello et al. |
| 11,822,706 B2 | 11/2023 | Anchi et al. |
| 11,907,530 B2 | 2/2024 | Desanti et al. |
| 11,928,365 B2 | 3/2024 | Anchi et al. |
| 11,940,935 B2 | 3/2024 | Bar-Ilan et al. |
| 12,026,402 B2 | 7/2024 | Paulchamy et al. |
| 12,086,431 B1 | 9/2024 | Dreier et al. |
| 12,088,470 B2 | 9/2024 | Radi et al. |
| 12,105,989 B2 | 10/2024 | Desanti et al. |
| 2001/0002912 A1 | 6/2001 | Tony et al. |
| 2002/0016921 A1 | 2/2002 | Olsen et al. |
| 2003/0235206 A1 | 12/2003 | Heller |
| 2004/0097217 A1 | 5/2004 | Mcclain |
| 2005/0071585 A1 | 3/2005 | Hayardeny et al. |
| 2005/0271055 A1 | 12/2005 | Stupka |
| 2006/0242320 A1 | 10/2006 | Nettle et al. |
| 2007/0299880 A1 | 12/2007 | Kawabe et al. |
| 2009/0225351 A1 | 9/2009 | Lacagnina |
| 2010/0199330 A1 | 8/2010 | Schott et al. |
| 2012/0254554 A1 | 10/2012 | Nakajima |
| 2013/0196656 A1 | 8/2013 | Liu |
| 2013/0238636 A1 | 9/2013 | Subramanya et al. |
| 2013/0247223 A1 | 9/2013 | Park et al. |
| 2013/0297835 A1 | 11/2013 | Cho |
| 2015/0038076 A1 | 2/2015 | Naruse et al. |
| 2016/0241659 A1* | 8/2016 | Wessendorf .......... H04L 67/303 |
| 2017/0048322 A1* | 2/2017 | Desanti ............... H04L 67/1097 |
| 2017/0315522 A1 | 11/2017 | Kwon et al. |
| 2018/0052704 A1 | 2/2018 | Ohnishi |
| 2018/0074717 A1 | 3/2018 | Olarig et al. |
| 2018/0074984 A1 | 3/2018 | Olarig et al. |
| 2018/0084051 A1 | 3/2018 | Trachy |
| 2018/0270119 A1 | 9/2018 | Ballapuram |
| 2019/0020603 A1 | 1/2019 | Subramani et al. |
| 2019/0037033 A1 | 1/2019 | Khakimov et al. |
| 2019/0042144 A1 | 2/2019 | Peterson et al. |
| 2019/0047841 A1 | 2/2019 | Chang et al. |
| 2019/0245924 A1 | 8/2019 | Li |
| 2019/0318734 A1 | 10/2019 | Nair |
| 2019/0332766 A1 | 10/2019 | Guri et al. |
| 2019/0334949 A1 | 10/2019 | Guri et al. |
| 2020/0065269 A1 | 2/2020 | Balasubramani et al. |
| 2020/0081640 A1 | 3/2020 | Enz et al. |
| 2020/0136996 A1 | 4/2020 | Li et al. |
| 2020/0159421 A1 | 5/2020 | Karumbunathan et al. |
| 2020/0310657 A1 | 10/2020 | Cayton et al. |
| 2020/0319812 A1 | 10/2020 | He et al. |
| 2020/0329074 A1 | 10/2020 | Everhart |
| 2020/0349094 A1 | 11/2020 | Smith et al. |
| 2020/0409583 A1 | 12/2020 | Kusters et al. |
| 2020/0409893 A1 | 12/2020 | Puttagunta et al. |
| 2021/0019272 A1 | 1/2021 | Olarig et al. |
| 2021/0028987 A1 | 1/2021 | Krivenok |
| 2021/0037105 A1 | 2/2021 | Smith-Denny et al. |
| 2021/0064281 A1 | 3/2021 | Satapathy et al. |
| 2021/0117249 A1 | 4/2021 | Doshi et al. |
| 2021/0124695 A1 | 4/2021 | Jaiswal et al. |
| 2021/0126861 A1 | 4/2021 | Rajendiran et al. |
| 2021/0263686 A1 | 8/2021 | Satapathy et al. |
| 2021/0263762 A1 | 8/2021 | Kachare et al. |
| 2021/0286540 A1 | 9/2021 | Tylik et al. |
| 2021/0286741 A1 | 9/2021 | Smith et al. |
| 2021/0286745 A1 | 9/2021 | Smith et al. |
| 2021/0288878 A1 | 9/2021 | Smith et al. |
| 2021/0289027 A1 | 9/2021 | Smith et al. |
| 2021/0289029 A1 | 9/2021 | Smith et al. |
| 2021/0311899 A1 | 10/2021 | Smith et al. |
| 2021/0391988 A1 | 12/2021 | Bedau |
| 2021/0397351 A1 | 12/2021 | Dhatchinamoorthy et al. |
| 2022/0014592 A1* | 1/2022 | Kachare .................. H04L 67/51 |
| 2022/0027076 A1 | 1/2022 | Reichbach et al. |
| 2022/0030062 A1 | 1/2022 | Jennings et al. |
| 2022/0066799 A1 | 3/2022 | Pinto et al. |
| 2022/0075539 A1 | 3/2022 | Juch et al. |
| 2022/0174094 A1 | 6/2022 | Subbiah et al. |
| 2022/0237274 A1 | 7/2022 | Paul et al. |
| 2022/0286377 A1 | 9/2022 | Smith et al. |
| 2022/0286508 A1 | 9/2022 | Smith et al. |
| 2023/0035799 A1 | 2/2023 | Desanti |
| 2023/0305700 A1 | 9/2023 | Desanti et al. |
| 2023/0325200 A1 | 10/2023 | Desanti et al. |
| 2023/0353462 A1 | 11/2023 | Cho |
| 2024/0020055 A1 | 1/2024 | Desanti et al. |
| 2024/0020056 A1 | 1/2024 | Desanti et al. |
| 2024/0020057 A1 | 1/2024 | Paulchamy et al. |

OTHER PUBLICATIONS

"Hard zoning versus soft zoning in a FC/FCoE San," [online], [Retrieved Oct. 12, 2020] Retrieved from Internet (5pgs).

"NVM Express Base Specification," revision 1.4, Jun. 10, 2019, [online], [Retrieved Oct. 12, 2020] Retrieved from Internet (403pgs).

"NVM Express Over Fabrics," revision 1.0, ratified May 31, 2016, [online], [Retrieved Oct. 12, 2020] Retrieved from Internet (49pgs).

"NVMe over Fabrics' Discovery problem," [online], [Retrieved Oct. 12, 2020] Retrieved from Internet (2pgs).

Claudio Desanti, "Subsystem Driven Zoning with Pull Registration Model," NVM Express, Feb. 1, 2022. (8pgs).

INCITS 548-2020, Information Technology—Fibre Channel—Generic Services—8 (FC-GS-8), American National Standard for Information Technology, 2020 (431 pages).

Notice of Allowance & Fee(s) Due received Dec. 10, 2024, U.S. Appl. No. 17/863,277. (5 pgs).

Notice of Allowance & Fee(s) Due received Dec. 18, 2024, U.S. Appl. No. 17/863,263. (10 pgs).

Notice of Allowance & Fee(s) Due received Jun. 25, 2024, U.S. Appl. No. 17/863,277. (5 pgs).

Notice of Allowance & Fee(s) Due received Dec. 28, 2023, U.S. Appl. No. 17/865,244. (30pgs).

Notice of Allowance & Fee(s) Due received Apr. 29, 2024, U.S. Appl. No. 17/699,005. (11 pgs).

Notice of Allowance & Fee(s) Due received Jan. 8, 2024, U.S. Appl. No. 17/699,005. (10pgs).

Notice of Allowance and Fee(s) Due, mailed Mar. 4, 2025, U.S. Appl. No. 17/863,300. (5pgs).

NVM Express Over Fabrics, revision 1.1, Oct. 22, 2019, [online], [Retrieved Oct. 12, 2020] Retrieved from Internet <URL:http://nvmexpress.org> (83pgs).

NVM Express TM over Fabrics, Revision 1.1a, Jul. 12, 2021, [online], [Retrieved Jan. 12, 2024]. Retrieved from Internet 2021. (84 pgs).

NVMe-oF™: Discovery Automation for NVMe® IP-based SANs, SNIA NSF Networking Storage, Nov. 2021. (49pgs).

(56) References Cited

OTHER PUBLICATIONS

Office Action mailed Sep. 12, 2024, U.S. Appl. No. 17/863,263. (25pgs).
Office Action received Mar. 14, 2024, U.S. Appl. No. 17/863,263. (25pgs).
Office Action received Jan. 24, 2024, U.S. Appl. No. 17/863,277. (15pgs).
Office Action received Oct. 24, 2024, U.S. Appl. No. 17/863,300. (24pgs).
Office Action received Oct. 26, 2023, U.S. Appl. No. 17/699,005. (10pgs).
Office Action received Jul. 3, 2024, U.S. Appl. No. 17/863,300. (19pgs).
Office Action received Mar. 6, 2024, U.S. Appl. No. 17/863,300. (23pgs).
Office Action received Nov. 9, 2023, U.S. Appl. No. 17/863,300. (18pgs).
Response filed Jan. 24, 2025, U.S. Appl. No. 17/863,300. (12pgs).
Response filed Nov. 28, 2023, U.S. Appl. No. 17/699,005. (11pgs).
Response filed Sep. 3, 2024, U.S. Appl. No. 17/863,300. (12pgs).
Response filed Jun. 6, 2024, U.S. Appl. No. 17/863,300. (14pgs).
Response filed Jun. 7, 2024, U.S. Appl. No. 17/863,263. (16pgs).
Response filed Apr. 9, 2024, U.S. Appl. No. 17/863,277. (14pgs).
Response filed Feb. 9, 2024, U.S. Appl. No. 17/863,300. (16pgs).
Non-Final Office Action (2580), including List of Ref., dated May 22, 2025, in U.S. Appl. No. 17/863,300 (19 pgs).
Notice of Allowance (2578), including List of References Considered by Examiner, dated May 21, 2025, in U.S. Appl. No. 17/863,263 (33 pgs).
Erik Smith, "NVM Express Technical Proposal for New Feature," nvm Express, Dell EMC, Jan. 11, 2022. (9 pgs).
Erik Smith et al., "NVM Express Technical Proposal (TP) 8010," nvm Express, Jan. 12, 2022. (82 pgs).
Erik Smith et al., "NVM Express Technical Proposal (TP) 8010a," nvm Express, May 9, 2022. (80 pgs).
Non-Final Office Action (2580), including List of Ref. Considered by Examiner, dated Jul. 25, 2025, in U.S. Appl. No. 17/863,300 (52 pgs).
Office Action U.S. Appl. No. 18/335,987 (86pgs).
Response filed Jun. 22, 2025, U.S. Appl. No. 17/863,300 (10 pgs).
Response filed Oct. 27, 2025, U.S. Appl. No. 17/863,300 (13 pgs).

\* cited by examiner

200
GAPZ Request — 202 
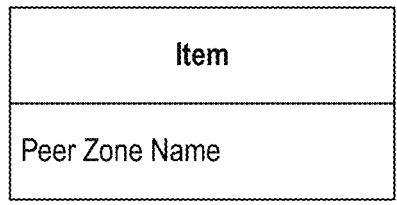
Item
Peer Zone Name — 204
GAPZ Response — 210 
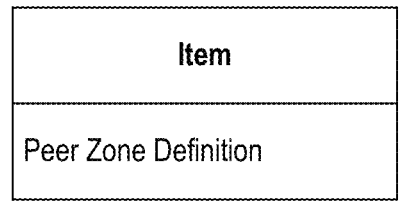
Item
Peer Zone Definition — 214
220
AAPZ Request — 222 
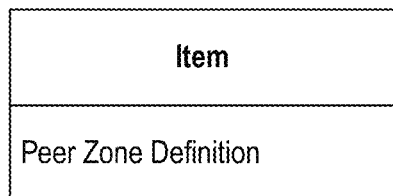
Item
Peer Zone Definition — 224
AAPZ Response — 230 
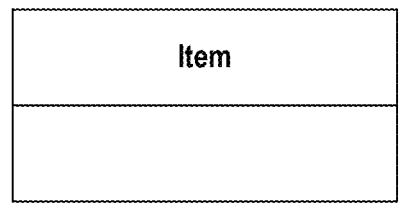
Item
240
RAPZ Request — 242 
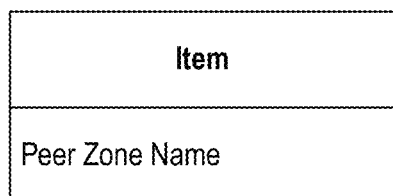
Item
Peer Zone Name — 244
RAPZ Response — 250 
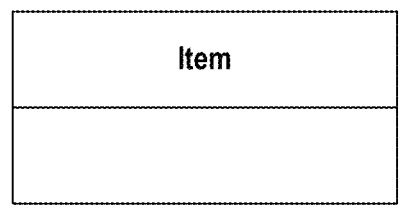
Item
*Prior Art*
FIG. 2

| Zone Name | ZoneGroup {Florence, NQN(CDC)} | ZoneGroup {Pisa, NQN(Storage3)} | | ZoneGroup {Siena, NQN(CDC)} | |
|---|---|---|---|---|---|
| | αβ | γδε | | φ | λ |
| Zone Members | {Host A, host} | {Host B, host} | | {Host E, host} | {Host A, host} |
| | {Storage 1, subsystem} | {Host C, host} | | {Storage 4, subsystem} | {Storage 4, subsystem} |
| | {Storage 2, subsystem} | {Host D, host} | | {Storage 5, subsystem} | |
| | | {Storage 3, subsystem} | | | |

405 — ZoneGroup {Florence, NQN(CDC)}
410 — ZoneGroup {Pisa, NQN(Storage3)}
415 — ZoneGroup {Siena, NQN(CDC)}

600
GAZ Request — 602
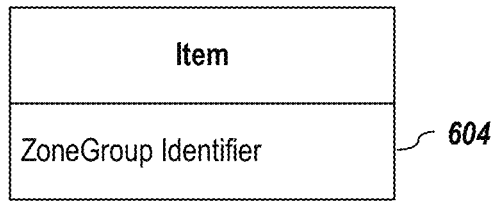
GAZ Response — 610
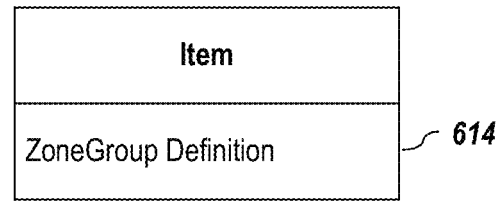
620
AAZ Request — 622
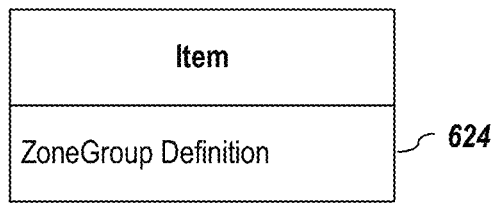
AAZ Response — 630
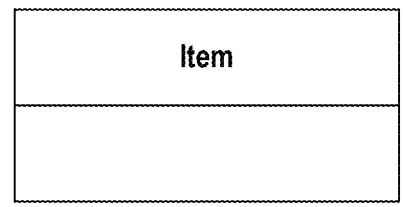
640
RAZ Request — 642
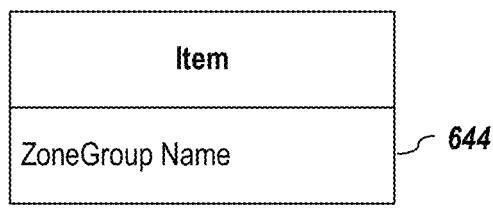
RAZ Response — 650
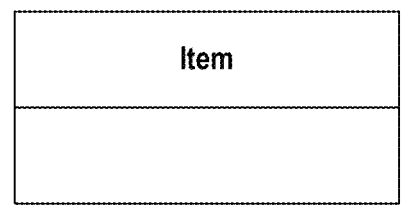
FIG. 6

1200

```
┌─────────────────────────────────────────────────┐
│ For each zone group from a set of one or more   │
│ zone groups, maintain a datastore that          │─ 1205
│ correlates a token to a zone group              │
│ identifier for the zone group                   │
└─────────────────────────────────────────────────┘
                        │
                        ▼
┌─────────────────────────────────────────────────┐
│ Responsive to receiving a zoning lookup command │
│ comprising submission queue entry and data      │
│ transfer, in which the data transfer includes   │
│ a zone group identifier for a zone group and    │
│ verify if the identified zone group is locked   │─ 1210
│ and: (1) if the zone group is locked, return an │
│ error status; and (2) if the zone group is not  │
│ locked: (a) use the zone group identifier to    │
│ obtain a token corresponding to the zone group, │
│ identifier for the zone group; and (b) return   │
│ the token for the zone group                    │
└─────────────────────────────────────────────────┘
                        │
                        ▼
┌─────────────────────────────────────────────────┐
│ Responsive the zoning lookup command not being  │
│ a remove zone group operation, receive a        │─ 1215
│ subsequent command that comprises a submission  │
│ queue entry that includes the token to          │
│ identify the zone group                         │
└─────────────────────────────────────────────────┘
```

STORAGE SUBSYSTEM-DRIVEN ZONING IN A NON-VOLATILE MEMORY EXPRESS ENVIRONMENT

CROSS-REFERENCE TO RELATED APPLICATIONS

This patent application is a continuation of and claims the priority benefit of co-pending and commonly-owned U.S. patent application Ser. No. 17/699,005, filed on 18 Mar. 2022, entitled "STORAGE SUBSYSTEM-DRIVEN ZONING PROTOCOL EMBODIMENTS IN A NONVOLATILE MEMORY EXPRESS ENVIRONMENT," listing Claudio Desanti and David Black as inventors, and issued on 1 Oct. 2024 as U.S. Pat. No. 12,105,989. The above-mentioned patent document is incorporated by reference herein in its entirety and for all purposes.

BACKGROUND

A. Technical Field

The present disclosure relates generally to information handling systems. More particularly, the present disclosure relates to zoning in a Storage Area Network (SAN).

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Changes in SAN-related technologies have included the development of NVMe®, which represents a set of specifications related to storage access that allows host systems to communicate with non-volatile memory storage, such as flash and solid-state drives across a number of transports (e.g., PCI Express, RDMA (Remote Direct Memory Access), Fibre Channel (FC), and TCP (Transport Control Protocol)). However, NVMe® implementations have limitations that make it difficult to configure or operate a SAN environment, particularly relative to more mature protocols. Consider the concept of zoning in a Fibre Channel SAN.

Fibre Channel (FC) SAN zoning allows a SAN administrator to control communication between host and storage interfaces by grouping them to a zone. Zones may be created for a number of reasons, including to increase network security, and to prevent data loss or data corruption, by controlling access between devices or user groups. Once in a zone, the interfaces, now referred to as zone members, will be able to communicate with one another when the zone has been added to the active zone set of their fabric.

In Fibre Channel, zoning is managed through the Fabric Zone Server (FZS), either directly or through Peer Zoning, as shown in FIG. 1. FIG. 1 depicts typical zoning management in a Fibre Channel environment. Peer Zoning, which is recorded in Fabric Zone Server 110, may be via a management interface 105, or may be done via a storage subsystem (e.g., Storage 3 115).

Specifically, Peer Zoning allows a storage device (e.g., Storage 3 115) to leverage its administratively configured SCSI (Small Computer System Interface) LUN (Logical Unit Number) masking information to generate Zoning constraints. Peer Zoning may be managed through three operations:

(1) Get Active Peer Zone (GAPZ), to read a Peer Zone from the active zone set;
(2) Add/Replace Active Peer Zone (AAPZ), to write a Peer Zone in the active zone set; and
(3) Remove Active Peer Zone (RAPZ), to delete a Peer Zone in the active zone set.

The information carried in the payloads associated with these operations is shown in FIG. 2. The Get Active Peer Zone (GAPZ) operation 200 comprises a GAPZ Request 202, in which a Peer Zone name 204 is submitted to the Fabric Zone Server, which returns in a GAPZ Response 210, a corresponding Peer Zone definition 214 from the active zone set. The Add/Replace Active Peer Zone (AAPZ) operation 220 comprises an AAPZ Request 222, in which the Peer Zone definition 224 is provided to the Fabric Zone Server for adding or replacing, and the Fabric Zone Server returns a confirmation that the operation has been performed (i.e., confirmation of the addition or replacement of the Peer Zone in the active zone set) by sending an AAPZ Response 230. Finally, the Remove Active Peer Zone (RAPZ) operation 240 comprises a RAPZ Request 242 that includes a Peer Zone name 244 that is to be deleted from the active zone set, and the Fabric Zone Server returns a confirmation (i.e., confirmation of the deletion of the Peer Zone from the active zone set) by sending a RAPZ Response 250.

While Peer Zoning in FC SANs is relatively straightforward, analogous processes do not exist in NVMe® SANs that are based on IP (Internet Protocol) networking. Accordingly, it is highly desirable to find new ways to support analogous zoning operations in NVMe® SANs that are based on IP networking.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 2 depicts Peer Zoning payloads for Fibre Channel operations.

FIG. 4 contains zoning configuration defined in Table 1, according to embodiments of the present disclosure.

FIG. 6 depicts subsystem-driven zoning operations payloads, according to embodiments of the present disclosure.

FIG. 12 depicts a method for performing an operation, according to embodiments of the present disclosure.

DETAILED DESCRIPTION OF EMBODIMENTS

Figure 1:
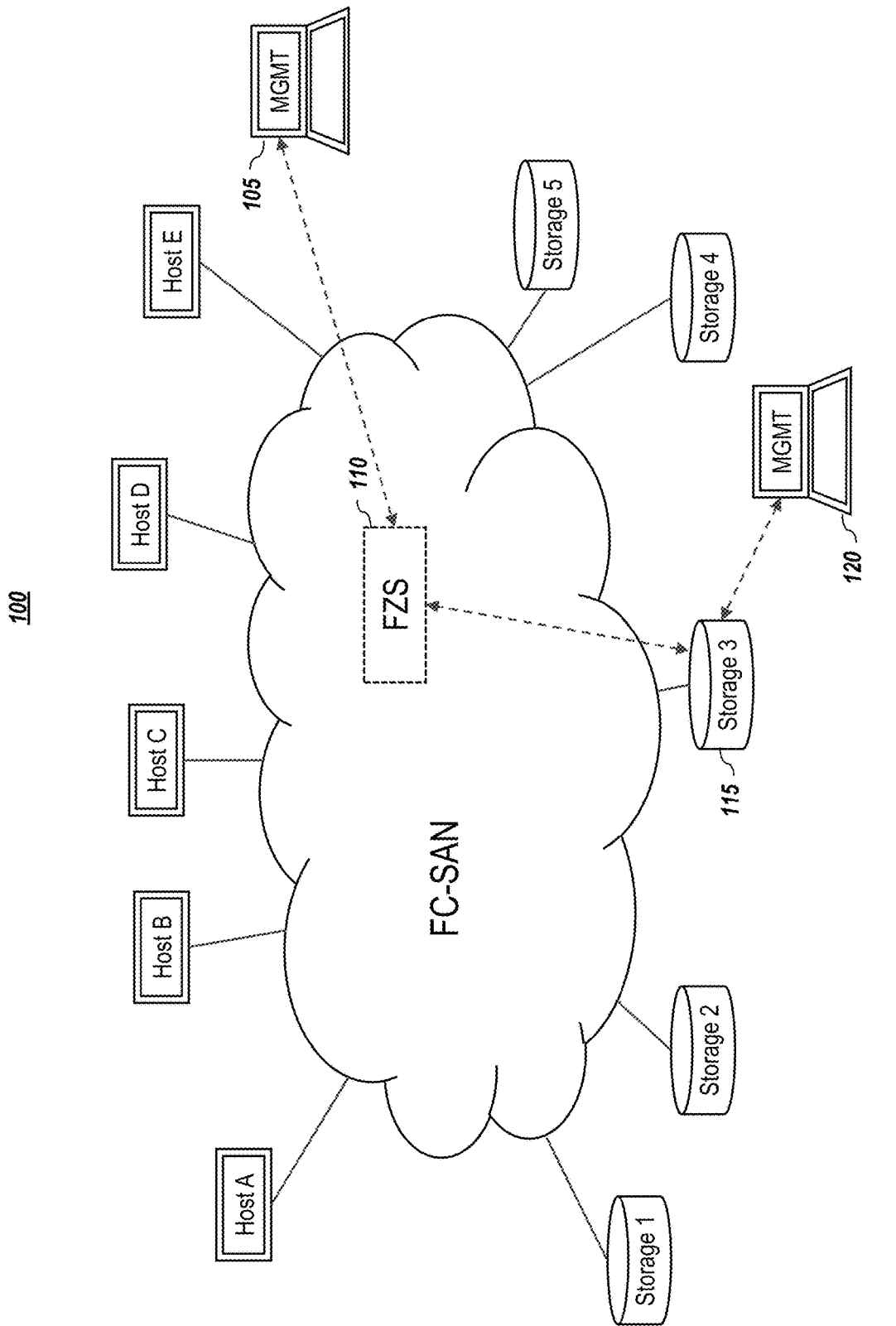
FIG. 1 depicts typical zoning management in a Fibre Channel environment.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, datastore, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of subsystem-driven zoning, aspects of the present disclosure are not so limited. Accordingly, the aspects of the present disclosure may be applied or adapted for use in other contexts.

A. General Introduction

As noted above, zoning operations exist in Fibre Channel, but limitations in NVMe® over IP environments do not support analogous functionality. In NVMe-oF™, zoning configurations (i.e., zone groups) are maintained by a centralized (i.e., network-based) discovery controller (CDC), which may also be referred to as a discovery controller, a central discovery controller, or a root discovery controller.

In one or more embodiments, a zone group is a unit of activation (i.e., a set of access control rules enforceable by the CDC). An example zone group dataset or data structure, according to embodiments of the present disclosure, may comprise a zone group name, a zone group originator, a number presenting the number of zones in the zone group, and a list of zone names or definitions are members of the zone group. In one or more embodiments, a Zone Group Originator is an identifier (e.g., an NVMe® Qualified Name (NQN)) of the entity that created or configured the zone group. For example, in one or more embodiments, the NQN may be the CDC's NQN, if the zone group was created/configured directly via the CDC; or, the NQN may be the NQN of an NVM subsystem, if the zone group was created via an NVM subsystem. It shall be noted that identifying the originator allows the system to determine which entity or entities are allowed to manage or alter an existing zone group.

In one or more embodiments, a zone group may be uniquely identified by a pair, e.g., {ZoneGroup Name, ZoneGroup Originator}, and a zone identifier may be defined by the tuple {{ZoneGroup Name, ZoneGroup Originator}, Zone Name}. It should be noted that previous approaches used global naming, which could create conflicts if two zones had the same name. Thus, such a system only works well if there is a single administrator who is carefully tracking each zone name to ensure that each one is unique. However, there typically is not a single administrator, particularly for large systems, which creates an environment in which zone naming conflicts could easily occur. Unlike the global naming used by previous approaches, each zone in embodiments herein is uniquely identified by the tuple so there will not be a conflict between different zones with the same zone name belonging to different zone groups. For example, if an NVM subsystem configured a zone, Zone Alpha, in a Zone Group 1 and the CDC configures a zone, Zone Alpha, is Zone Group 2, there will not be a conflict between these two zone names because the two zone identifiers are the tuple (e.g., {ZG1, ZGO-NVM_Sub1, Alpha} vs. {ZG2, ZGO-CDC, Alpha}).

Figure 3:
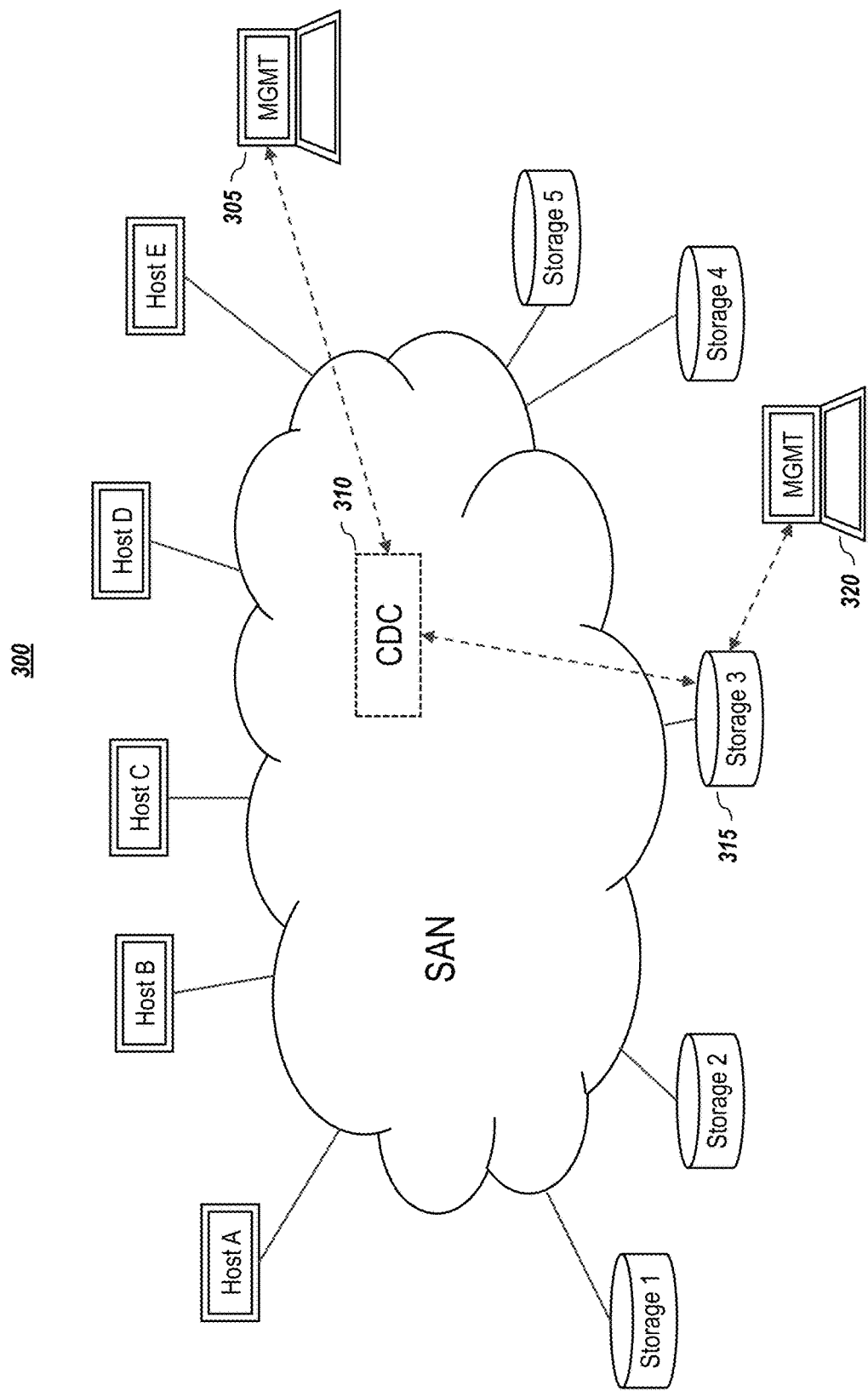
FIG. 3 depicts zoning management in an NVMe™-over Fabrics (NVMe-oF™) environment, according to embodiments of the present disclosure.

In NVMe-oF™, zoning configurations (i.e., zone groups) are maintained by the CDC. FIG. 3 depicts zoning management in an NVMe-oF™ environment, according to embodiments of the present disclosure. As illustrated, zone groups may be generated, activated, and deactivated by a SAN administrator through a management application 305 that interacts with the CDC 310, or by a storage subsystem 315, via a management interface 320, through in-band management commands. A subsystem 315 may generate zone group(s) as a result of storage allocation configurations defined on the device by a storage administrator via a management interface 320.

When a zone group is created on the CDC 310 by a SAN administrator through a management application, the zone group originator is the CDC's NQN. When a zone group is created on the CDC by a subsystem through in-band management commands, the zone group originator is the subsystem's NQN.

Figure 5:
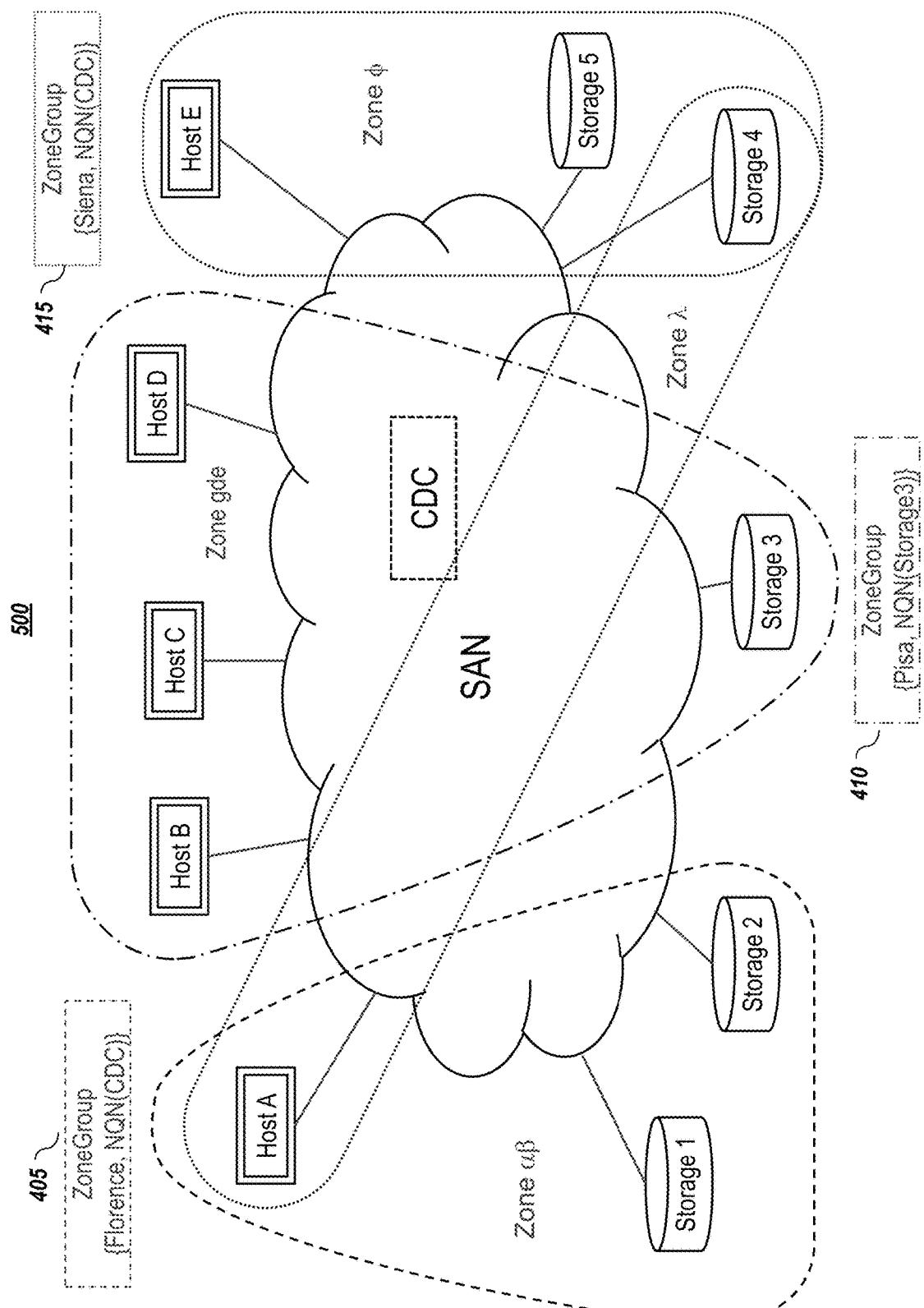
FIG. 5 graphically depicts the zoning configuration of Table 1, according to embodiments of the present disclosure.

For example, considering the zoning configuration defined in Table 1, which is shown in FIG. 4, and is represented graphically in FIG. 5, zone groups {Florence, NQN(CDC)} 405 and {Siena, NQN(CDC)} 415 have been created on the CDC by a SAN administrator through a management application and have NQN(CDC) as zone group originator, while ZoneGroup {Pisa, NQN(Storage3)} 410 have been created on Storage 3 and has NQN(Storage3) as zone group originator.

As noted above, zone groups may be identified by the pair {ZoneGroup Name, ZoneGroup Originator NQN}, which can be up to 256 bytes long. As will be discussed in more detail below, this identifier size—256 bytes—is too large to work directly with the command structure for NVMe® environments.

Embodiments of subsystem-driven zoning (SDZ) for NVMe® environments may be based on zone groups, have analogous operations to FC Peer Zoning, and are implemented as NVMe® operations:

(1) Get Active ZoneGroup (GAZ), to read a zone group from the active zone(s) database (ZoneDBActive);
(2) Add/Replace Active ZoneGroup (AAZ), to write a zone group in the ZoneDBActive; and
(3) Remove Active ZoneGroup (RAZ), to delete a zone group in the ZoneDBActive.

The information carried in the payloads associated with these operations is shown in FIG. 6. FIG. 6 depicts subsystem-driven zoning operations payloads, according to embodiments of the present disclosure. The Get Active ZoneGroup (GAZ) operation 600 comprises a GAZ Request 602, in which a zone group identifier 604 is submitted to the CDC, which returns in a GAZ Response 610, a corresponding zone group definition 614 from the active zone database. The Add/Replace Active ZoneGroup (AAZ) operation 620 comprises an AAZ Request 622, in which the zone group definition 624 is provided to the CDC for adding or replacing, and the CDC returns operational status of the addition or replacement of the zone group in the active zone database by sending an AAZ Response 630. Finally, the Remove Active Zone (RAZ) operation 640 comprises a RAZ Request 642 that includes a zone group name 644 that is to be deleted from the active zone database, and the CDC returns operational status of the deletion of the zone group from the active zone set by sending a RAZ Response 650.

Figure 7:
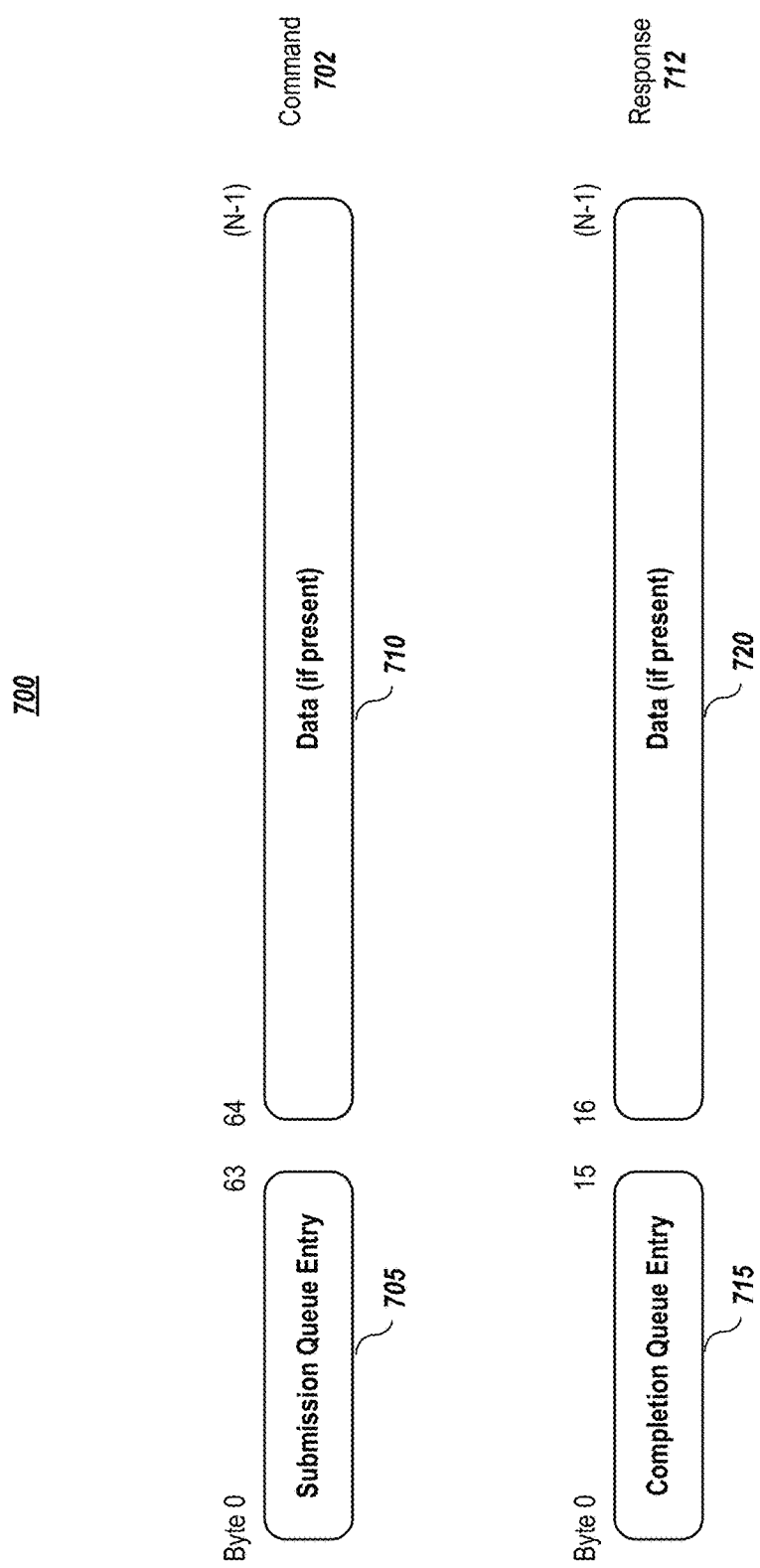
FIG. 7 graphically depicts NVMe® capsule structures, according to embodiments of the present disclosure.

To match the functionality of Fibre Channel, these operations should be supported in NVMe® environments and implemented using NVMe's command/response structure 700. The general structure 700 of NVMe® capsules are shown in FIG. 7. NVMe® supports transfer of data in the direction of the command (host-to-controller data transfer, e.g., a "write" operation) or in the direction of the response (controller-to-host data transfer, e.g., a "read" operation), but not both. A command capsule 702 comprises a submission queue entry 705 and may include a payload transfer 710. Similarly, a response capsule 712 comprises a completion queue entry 715 and may include a data/payload transfer 720. It shall be noted that, while although the byte count for the command data/payload transfer is depicted as continuing from the submission queue entry or completion queue entry, the data transfer may, in one or more embodiments, occur separate from transmission of the submission queue entry or completion queue entry (e.g., at some point before or after transmission of the submission queue entry or completion queue entry).

Figure 8:
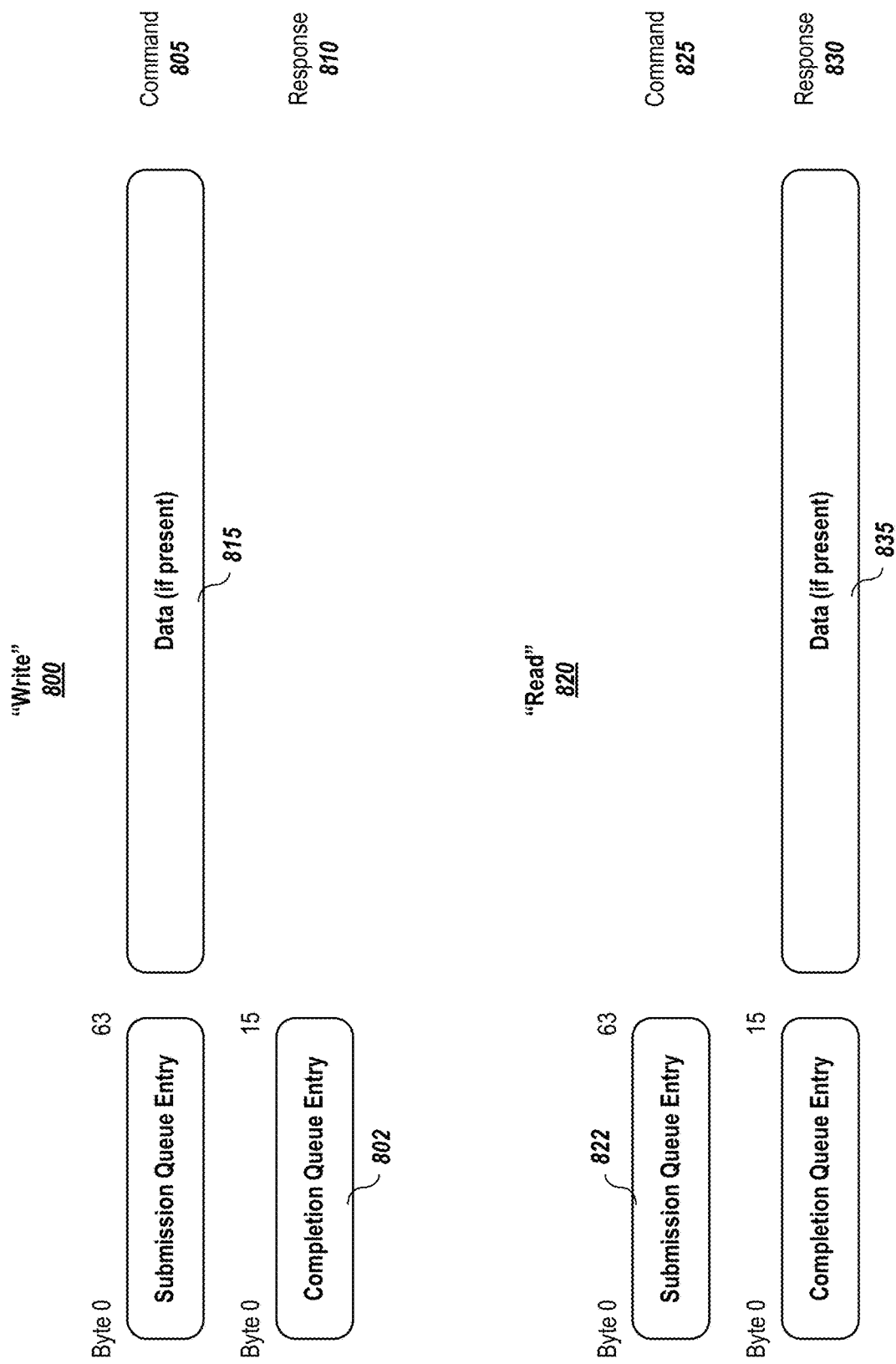
FIG. 8 graphically depicts NVMe-oF™ "write" command and "read" command capsule structures, according to embodiments of the present disclosure.

There are two supported types of operation: host-to-controller data transfer and controller-to-host data transfer, which are analogous to the transfers for write operations and read operation, respectively. As illustrated in FIG. 8, for a "write" operation 800, data (if any) 815 is present in the command 805; there is no data in the response 810. Note also that there is a limited maximum data size in the Completion Queue Entry (CQE) 802. A CQE 802 has a size of 16 bytes. For a "read" operation 820, data 835 (if any) is present in the response 830; there is no data in the command 825. Note also that there is a limited maximum data size in the Submission Queue Entry (SQE) 822. An SQE 822 has a size of 64 bytes. It should be noted that, in one or more embodiments, the data may be communicated in a separate data channel related to the command, but note that the data flow is limited in direction of the command (i.e., for a "write" command, the data flow is a host-to-controller data transfer, and for a "read" command, the data flow is a controller-to-host data transfer).

Note that this structure—unlike the Fibre Channel protocol which supports bidirectional transfers of data—does not support bidirectional transfers. The lack of bidirectional transfer is one of the limitations that exist in NVMe® environments. Note also that the data size limits for the SQE and CQE are also constraints.

Figure 9:
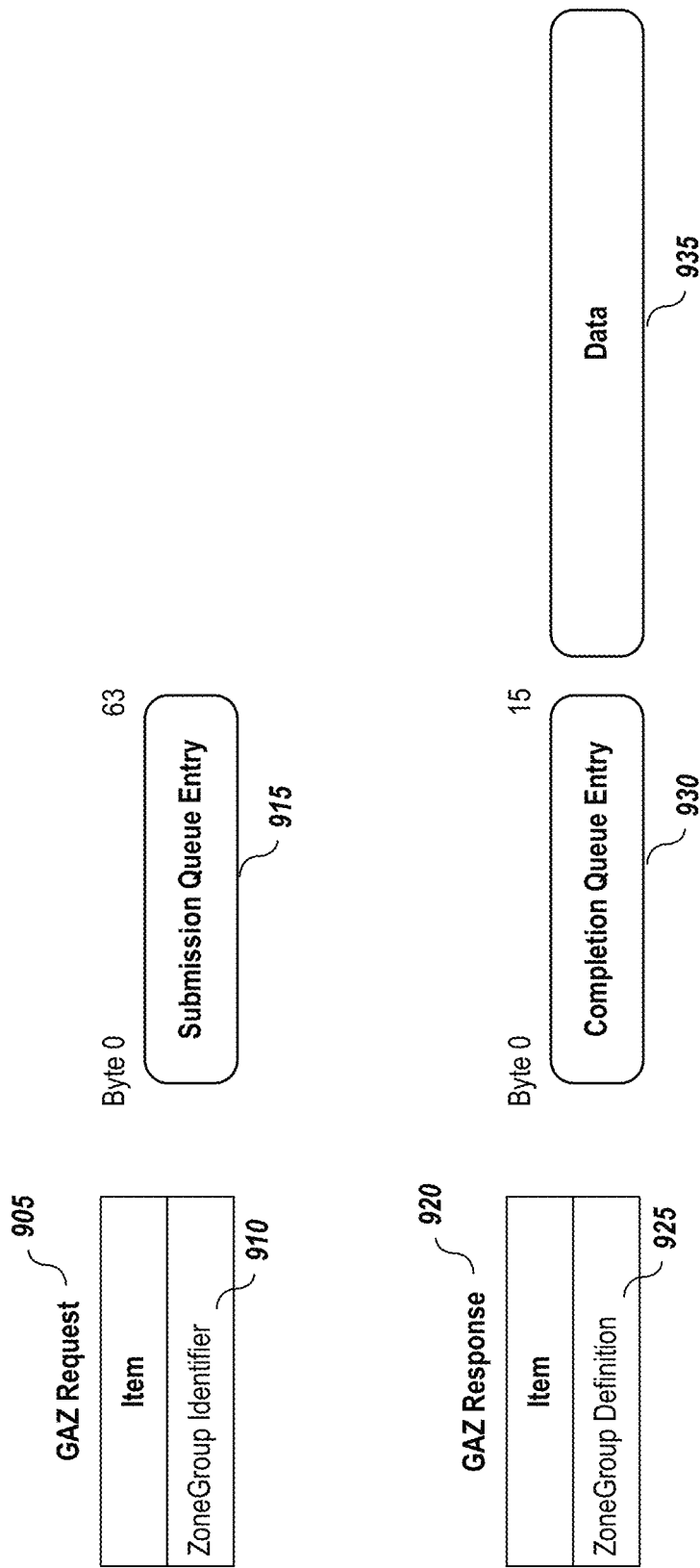
FIG. 9 depicts the Get Active ZoneGroup operation mapping issue given the one direction transfer command structure and SQE size limitation, according to embodiments of the present disclosure.

This structure 700/800 and 820 makes direct support of certain operations difficult. Consider, by way of illustration, a Get Active ZoneGroup (GAZ) operation, depicted in FIG. 9. The depicted operation comprises two elements: a GAZ Request 905 to supply the ZoneGroup Identifier 910 to the CDC, and a GAZ Response 900 to supply the corresponding ZoneGroup definition data. In NVMe®, the Get Active ZoneGroup (GAZ) operation is a "read" operation that includes a ZoneGroup identifier 910 to read that zone group. However, as already stated, zone groups are identified by the pair {ZoneGroup Originator, ZoneGroup Name}, which can be up to 256 bytes and therefore cannot fit within a Submission Queue Entry 915.

Given the limitations discussed above, there is a clear need for solutions that enable implementation of subsystem-driven zoning operations via NVMe® commands.

B. Subsystem-Driven Zoning Embodiments

Figure 10:
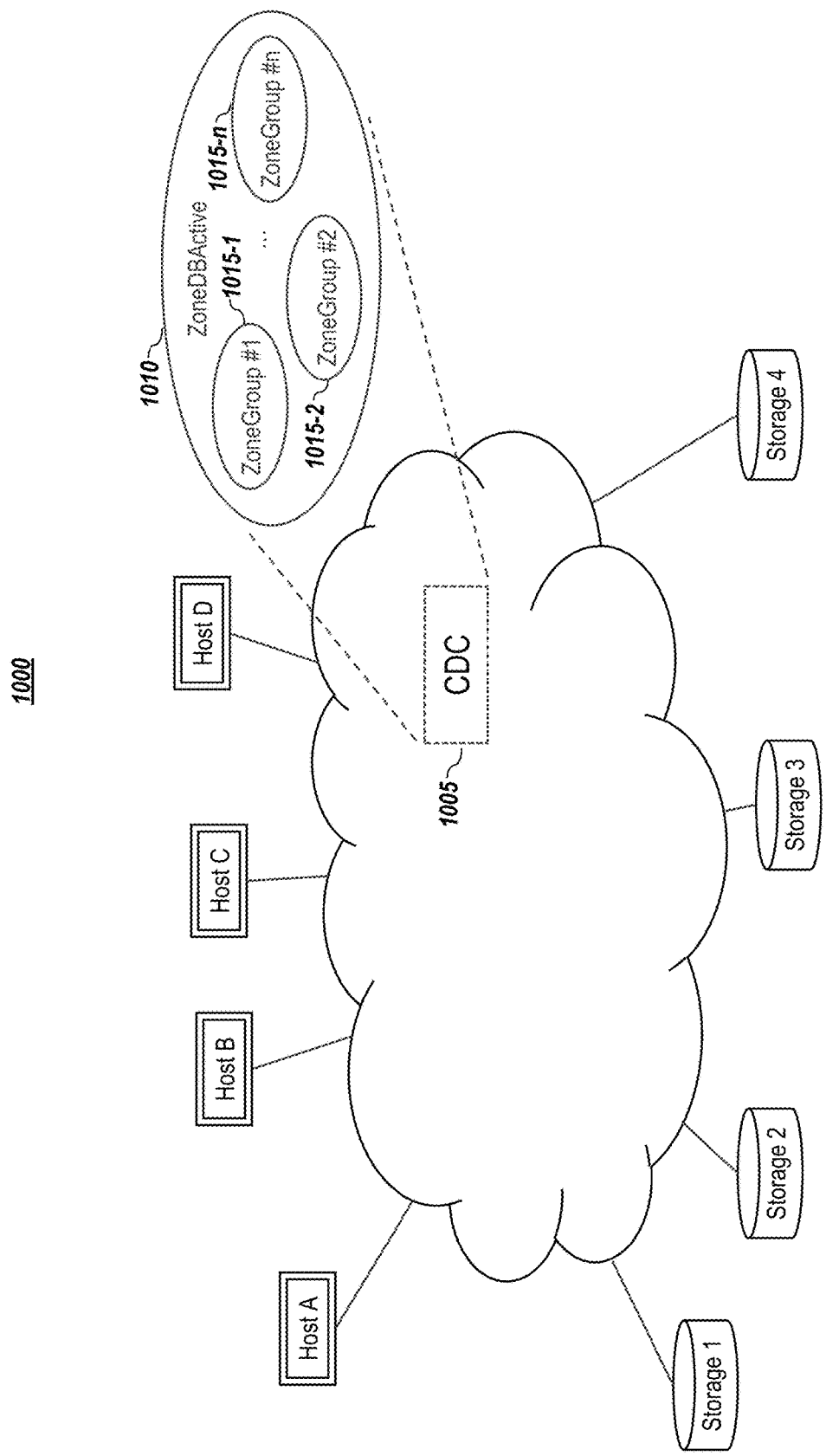
FIG. 10 depicts a storage area network (SAN) with a discovery controller, according to embodiments of the present disclosure.

Consider, by way of illustration, the SAN 1000 depicted in FIG. 10. The CDC 1005 of the network 1000 includes a zoning database or datastore 1010, which represents zone group(s) that are enforced in the network 1000. In the depicted example, zone group 1005-1 through zone group 1005-n are currently active. In one or more embodiments, a zone group may include one or more zones, members, aliases, attributes, etc. Note that, unlike Fibre Channel zoning that only allows one active access control policy to be active at once, more than one zone group may be active at a time, which provides greater granularity over the active zone groups. One zone group may be removed or changed without affecting the activation state of other active zone groups. Note that, in one or more embodiments, the ZoneDBActive 1010 facilitates enforcement actions, such as log page and event notifications filtering, and network-level restrictions, among other actions. The zone groups in the ZoneDBActive may be activated and enforced by the CDC in terms of filtering the discover information provided to hosts and storage elements.

Figure 11:
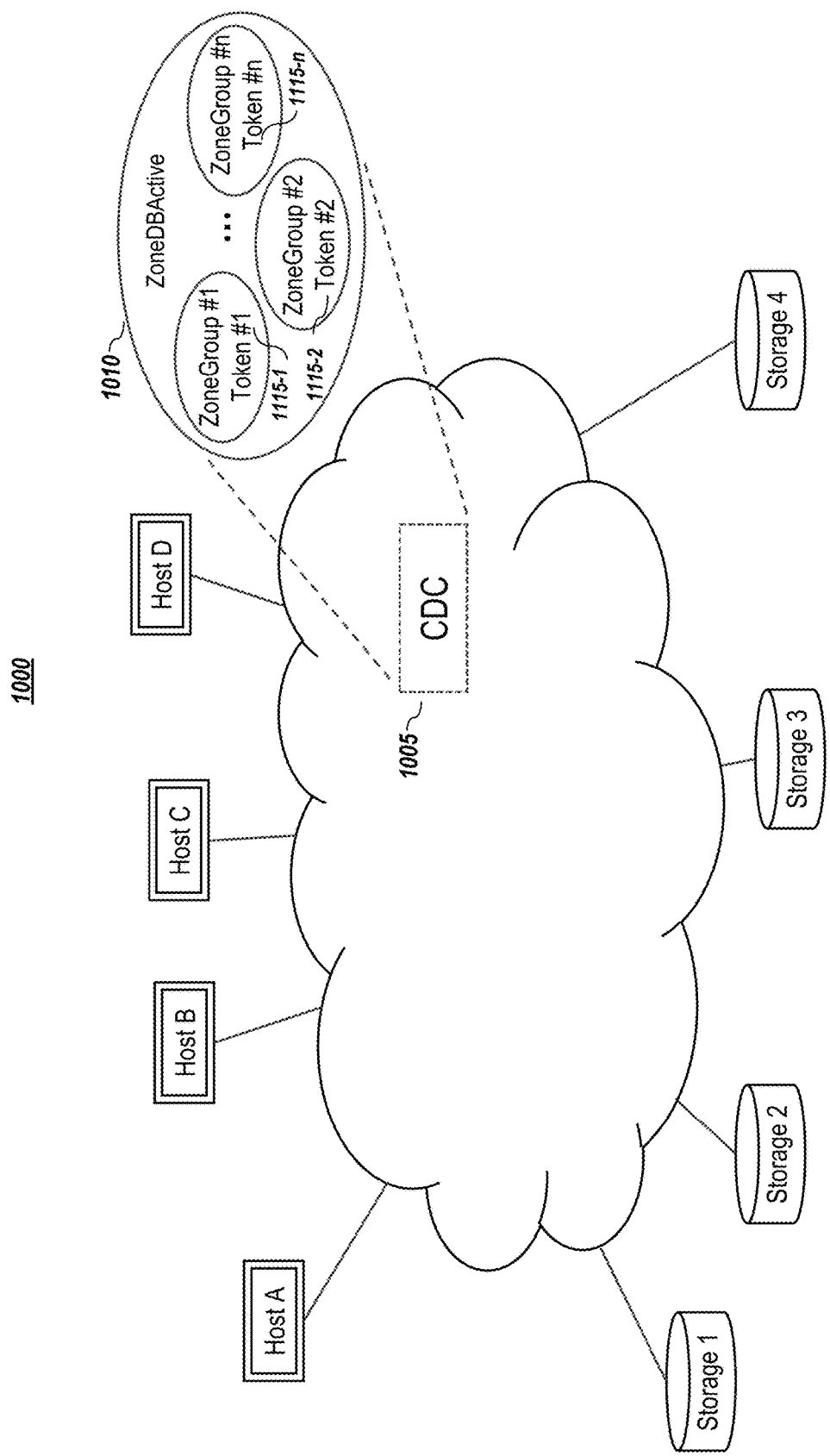
FIG. 11 depicts a storage area network (SAN) with a discovery controller that maintains a correlation between zone group identifiers and tokens, according to embodiments of the present disclosure.

In one or more embodiments, part of the solution to overcome the limitations discussed in the prior section is to allow the CDC to maintain a unique token, such as a 32-bit token, to identify a zone group. Consider the graphical representation, provided by way of illustration, in FIG. 11. FIG. 11 depicts the SAN of FIG. 10; however, the CDC 1005 comprises a zoning database 1010 that includes a token identifier 1115-x corresponding to each zone group. It shall be noted that the database(s) or table(s) that stores the correlation between token identifier and zone group identifier may be maintained in the zoning database 1010 or elsewhere. It shall also be noted that there need not be a one-to-one correspondence between zone group identifier 1015 and token identifier 1115. For example, a zone group may include a plurality of token identifiers, which may be maintained for a variety of purposes, including having different token identifiers for a zone group relative to different hosts, different subsystems, or both. It shall also be noted that a token identifier may change over time, except while it is in use to associate the multiple NVMe commands that implement a single zoning operation.

Embodiments also include defining three generic zoning commands, which may be used to implement three subsystem-defined zoning (SDZ) operations, GAZ, AAZ, and RAZ, which were discussed above. In one or more embodiments, the three generic zoning commands are:

(1) Fabric Zoning Lookup (FZL)—to retrieve a token associated with a specified ZoneGroup;
(2) Fabric Zoning Send (FZS)—to send zoning data to the CDC; and
(3) Fabric Zoning Receive (FZR)—to retrieve zoning data from the CDC.

FIG. 12 depicts a method for performing an operation, according to embodiments of the present disclosure. In one or more embodiments, for each zone group from a set of one or more zone groups, a datastore is maintained (1205) that correlates a token identifier to a zone group identifier for the zone group. As noted previously, in one or more embodiments, a zone group is a data structure maintained in a database (which may be the same datastore that stores the tokens or may be a different datastore) by a discovery controller (DC) (which may be the centralized discovery controller) that represents a set of one or more hosts that may access one or more storage subsystems. In one or more embodiments, the discovery controller, responsive to receiving a zoning lookup command comprising submission queue entry and data/payload transfer, in which the data transfer includes a zone group identifier for a zone group, uses (1210) the zone group identifier to verify if the identified zone group is locked, and:

(1) if the zone group is locked, returns an error status; and
(2) if the zone group is not locked: (a) uses the zone group identifier to obtain a token corresponding to the zone group identifier for the zone group; and (b) return the token for the zone group.

Figure 13:
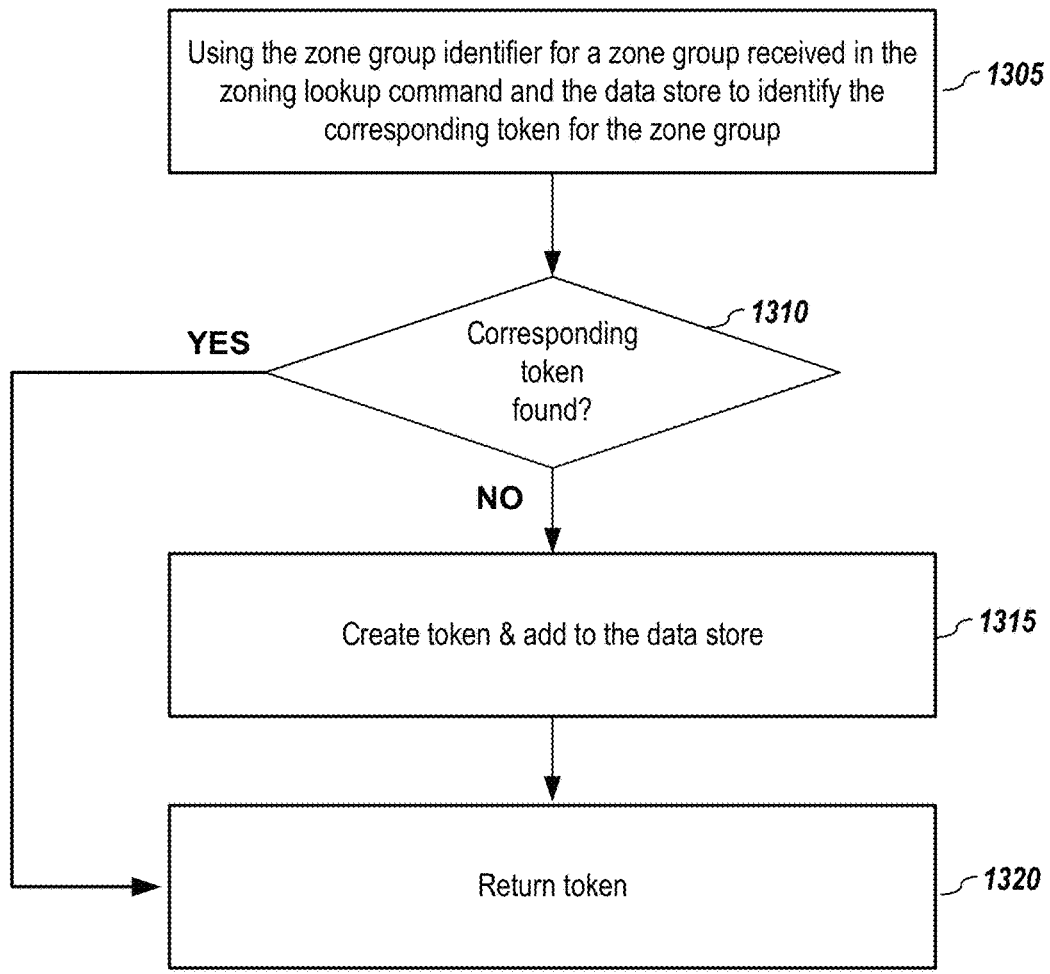
FIG. 13 depicts a method for returning a token related to a zone group, according to embodiments of the present disclosure.

In one or more embodiments, the step of using (1210) the zone group identifier to obtain a token corresponding to the zone group identifier for the zone group comprises the DC using the zone group identifier to look up the corresponding token in the datastore, such as the ZoneDBActive 1010 datastore in FIG. 11. It shall be noted that the discovery controller may assign a token to a zone group when it is first created or may assign a token to a zone group when requested. For example, as illustrated in the embodiment depicted in FIG. 13, the discovery controller uses (1305) the zone group identifier for a zone group received in the zoning lookup command and the datastore to identify a corresponding token for the zone group. If the discovery controller finds (1310) a token corresponding to the zone group identifier that was received in a zoning lookup command, the discovery controller returns (1320) the token. However, if the discovery controller does not find (1310) a token for the zone group identifier that was received in a zoning lookup command, the discovery controller may generate (1315) a token for the zone group and add the token to the datastore, in which the token is associated with the zone group identifier/zone group. It shall be noted that this step may also include adding a zone group and/or zone group identifier to the datastore if one is not present.

To address the data limit size of the SQE or CQE, in one or more embodiments, the token uses a memory size that fits within a SQE or CQE.

In one or more embodiments, responsive that zoning lookup command not being a remove zone group operation, the discovery controller receives a subsequent command that comprises a submission queue entry that includes the token identifier to identify the zone group. As illustrated in examples below, this subsequent command may be part of a Get Active ZoneGroup operation or an Add/Remove Active ZoneGroup operation.

In one or more embodiments, the zoning lookup command is a first command of two or more commands that form an operation (e.g., Get Active ZoneGroup operation) to obtain information about the zone group from the discovery controller, and the subsequent command(s) are a receive command that causes the discovery controller to return the information about the zone group.

In one or more embodiments, the zoning lookup command is a first command of two or more commands that form an operation (e.g., Add/Replace Active ZoneGroup operation) to make a change to the zone group, and the subsequent command(s) are a send command that causes the discovery controller to add the zone group to the database maintained by the discovery controller or to replace the zone group from the database maintained by the discovery controller.

In one or more embodiments, after receiving the initial zoning lookup command, the zone group may be locked. In such cases, the operation may be aborted and retried at a later time.

C. Example Operation Embodiments

1. Get Active ZoneGroup (GAZ) Operation Embodiments

Figure 14:
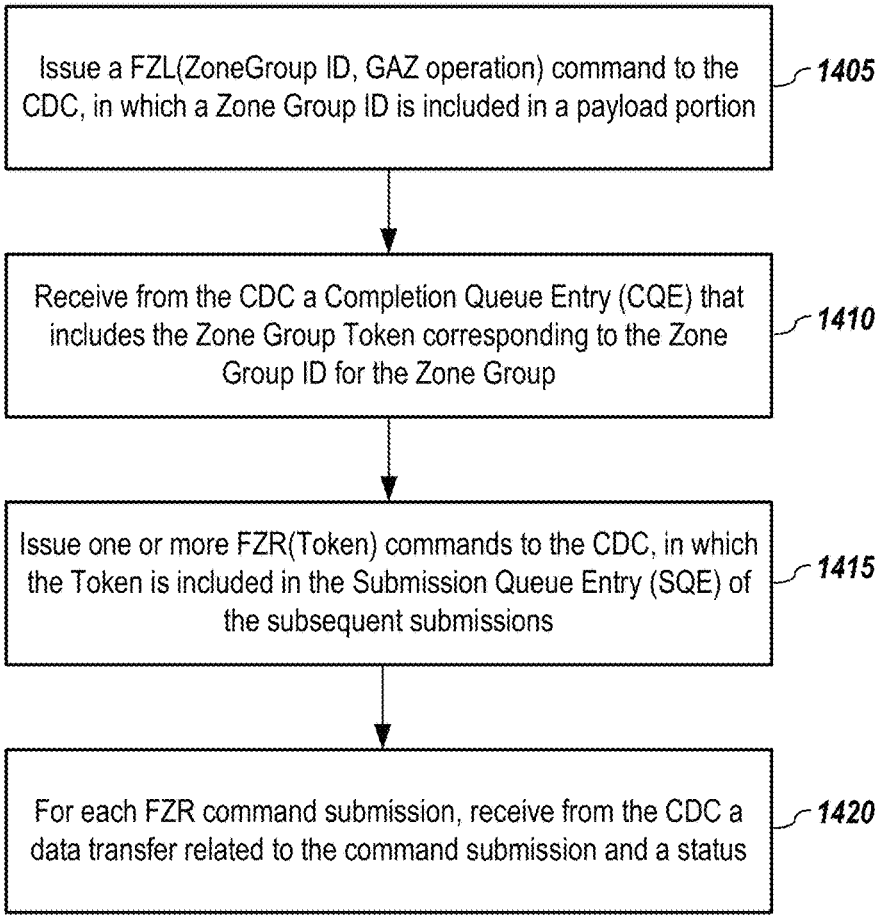
FIG. 14 depicts a method for performing a Get Active ZoneGroup (GAZ) operation, according to embodiments of the present disclosure.
Figure 15A:
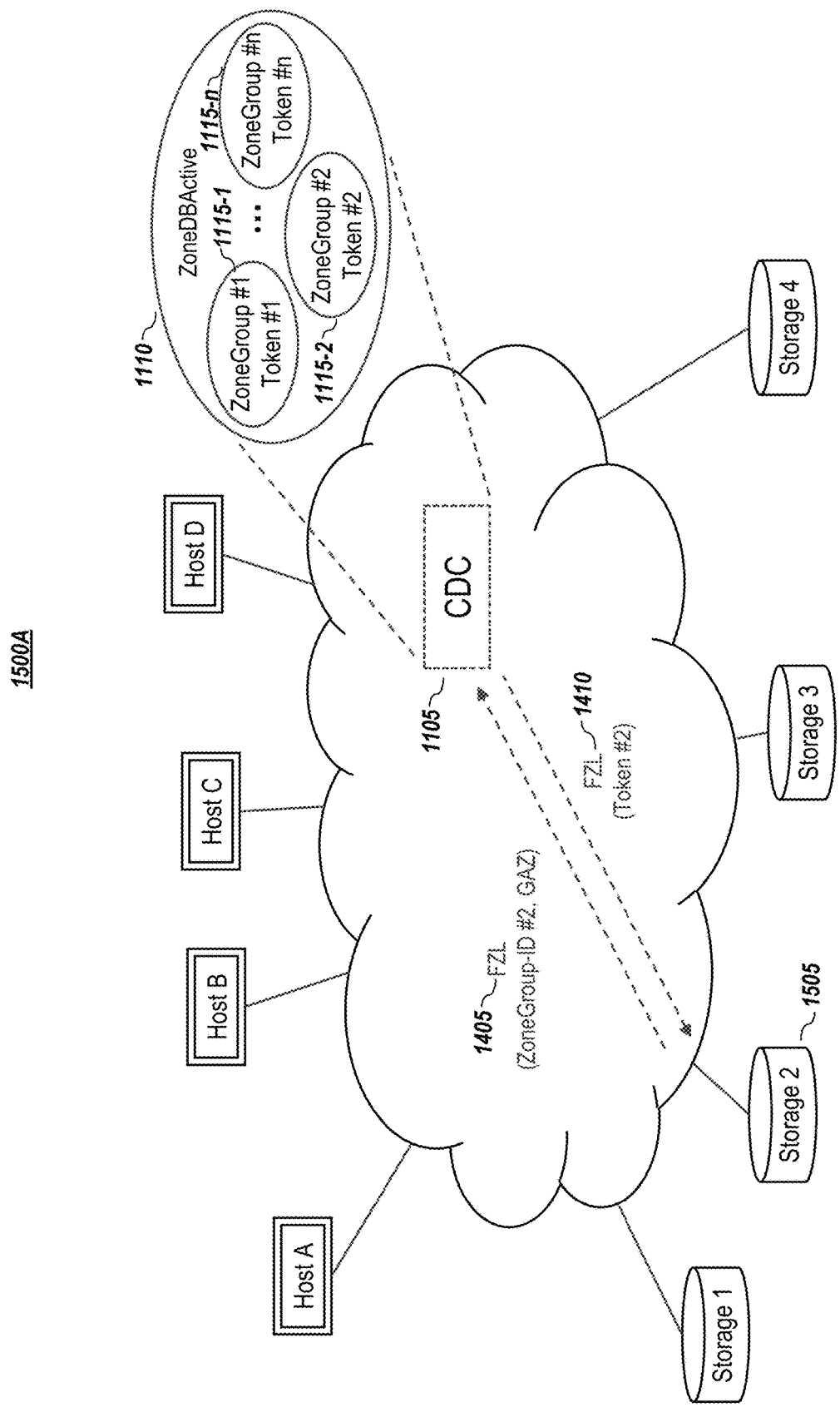
FIGS. 15A & 15B graphically depict two zoning commands for implementing a Get Active ZoneGroup (GAZ) operation, according to embodiments of the present disclosure.
Figure 15B:
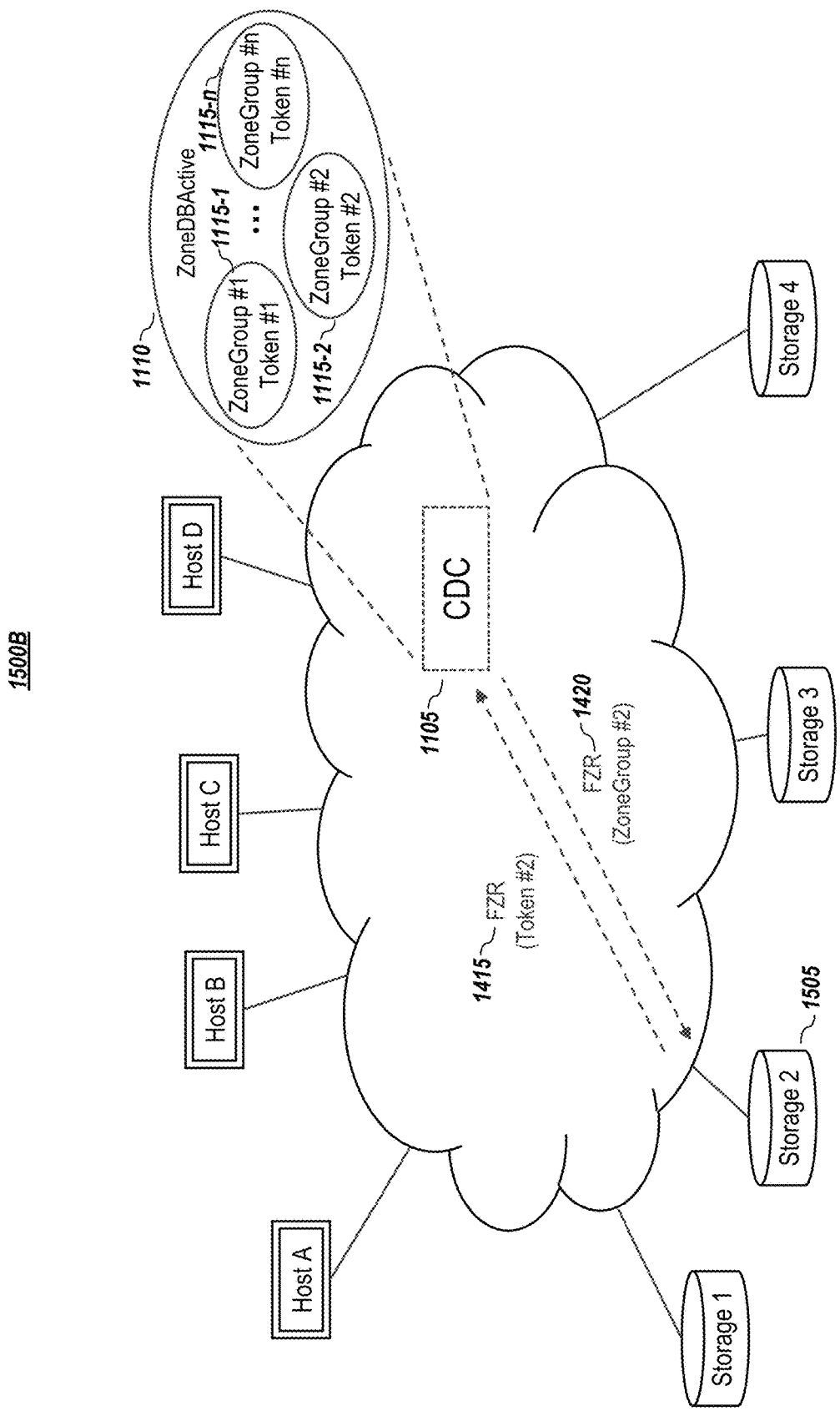

FIG. 14 depicts a method for performing a Get Active ZoneGroup (GAZ) operation, according to embodiments of the present disclosure. FIGS. 15A & 15B graphically depict two zoning commands for implementing a Get Active Zone-Group (GAZ) operation, according to embodiments of the present disclosure.

Figure 20:
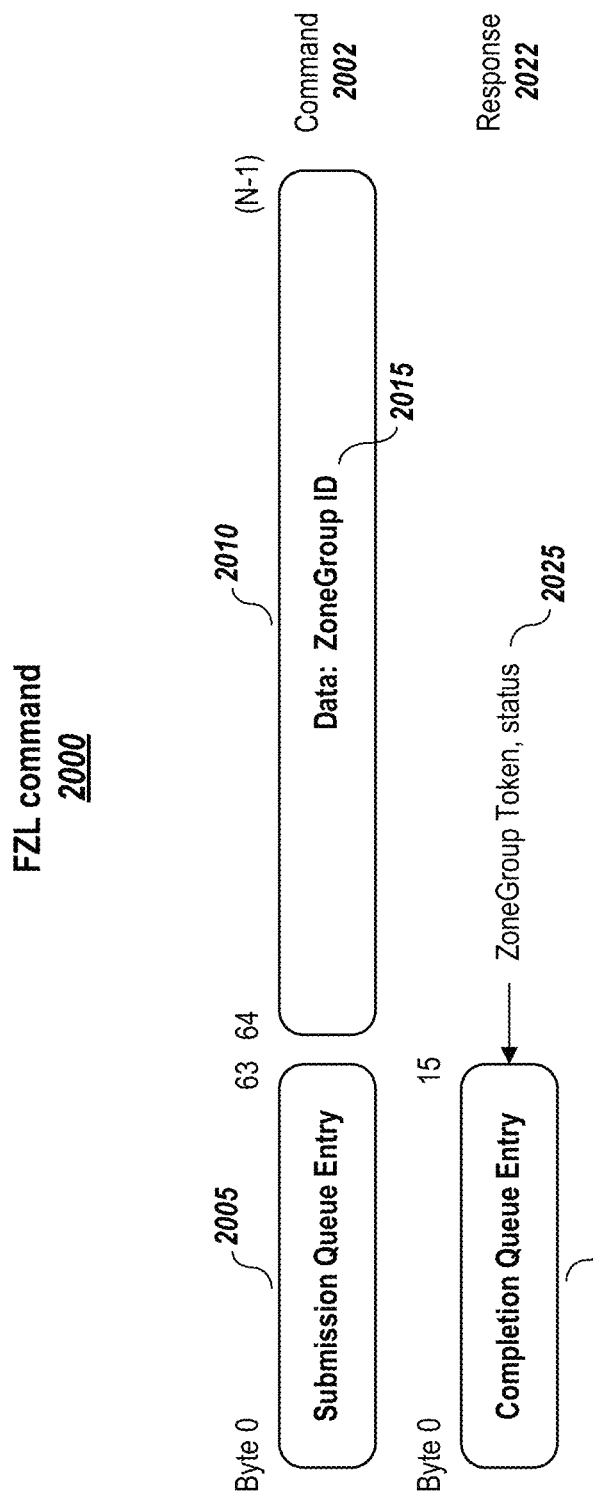
FIG. 20 graphically depicts a Fabric Zoning Lookup (FZL) command, according to embodiments of the present disclosure.

As shown in FIG. 14, the Get Active ZoneGroup operation commences by issuing (1405) a Fabric Zoning Lookup command, FZL (ZoneGroup ID, GAZ operation), to the discovery controller in order to retrieve a token associated with a zone group. FIG. 20 graphically depicts a FZL command 2000, according to embodiments of the present disclosure. As illustrated, the command 2002 includes a submission queue entry (SQE) 2005 and a data/payload transfer 2010. In this example, the payload portion 2010 of the FZL command includes the zone group identifier 2015 (in this example, ZoneGroup-ID #2). As noted previously, the data/payload transfer may alternatively occur in a communication channel.

In response to receiving the FZL command, the DC returns (1410) the zone group token in the FZL response along with the command status (e.g., successful). As shown in the embodiment depicted in FIG. 20, the response portion 2022 of the FZL command includes in the completion queue entry (CQE) portion 2020 the zone group token (in this example, Token #2) and the status.

These two steps 1405 and 1410 of the FZL command are graphically depicted in FIG. 15A. Storage 2 1505 sends to the CDC 1105 a FZL command 1405 with the zone group identifier (ZoneGroup-ID #2) included. The CDC 1105 uses the zone group identifier and its datastore 1110 to find the corresponding token, which it returns in the FZL response 1410.

Now that the storage (in this example Storage 2 1505) has the token, it has an identifier for the zone group that fits within a field in the SQE for the command, which can be used to complete the Get Active ZoneGroup operation.

Referring to FIG. 14 and FIG. 15B, the storage (i.e., Storage 2) issues (1415) one or more Fabric Zoning Receive (FZR) commands, FZR (Token), to the discovery controller 1105. In one or more embodiments, multiple FZR commands may be used if the zone group definition is larger than the buffer size used in these command transfers; thus, the zone group definition may then be fragmented and transferred one fragment at a time through multiple FZR commands.

Figure 21:
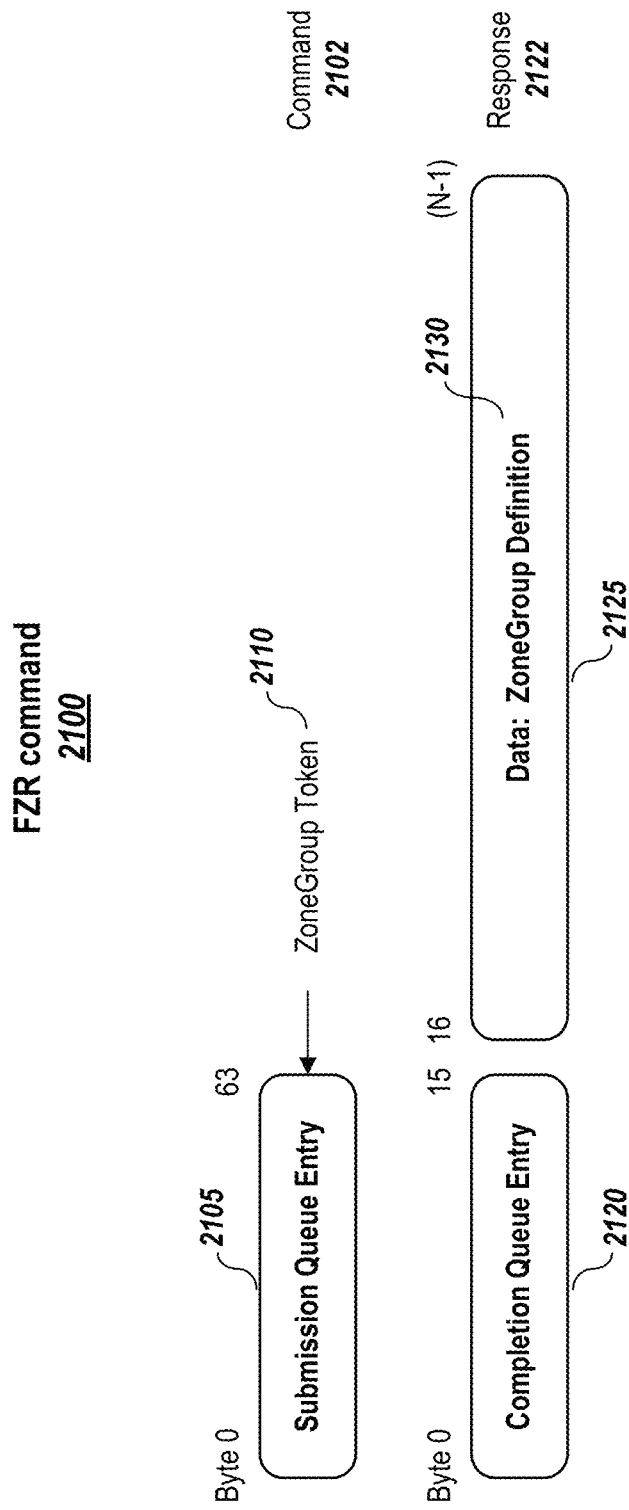
FIG. 21 graphically depicts a Fabric Zoning Receive (FZR) command, according to embodiments of the present disclosure.

FIG. 21 graphically depicts a FZR command 2100, according to embodiments of the present disclosure. As illustrated, the command 2102 includes a submission queue entry (SQE) portion 2105, in which the token is included for each submitted command. In this example, the SQE 2105 of the FZR command includes the zone group token 2110 (i.e., Token #2).

For each FZR command submission, the storage receives (1420) from the discovery controller a data transfer related to the command submission and a status. In one or more embodiments, an indicator (e.g., a bit) in the CQE specifies if the transferred zone group fragment is the last one. Returning to FIG. 21, the response portion 2122 of the FZR command 2100 comprises a completion queue entry (CQE) portion 2120 and a data/payload transfer portion 2125. In this example, the CQE portion 2120 includes the command status, and the payload transfer portion 2125 includes data about the zone group definition (in this case, zone group definition for Zone Group #2). In one or more embodiments, as noted above, the data may be sent via a communication channel. In such instances, a single FZR command may be sufficient.

2. Add/Replace Active ZoneGroup (AAZ) Operation Embodiments

Figure 16:
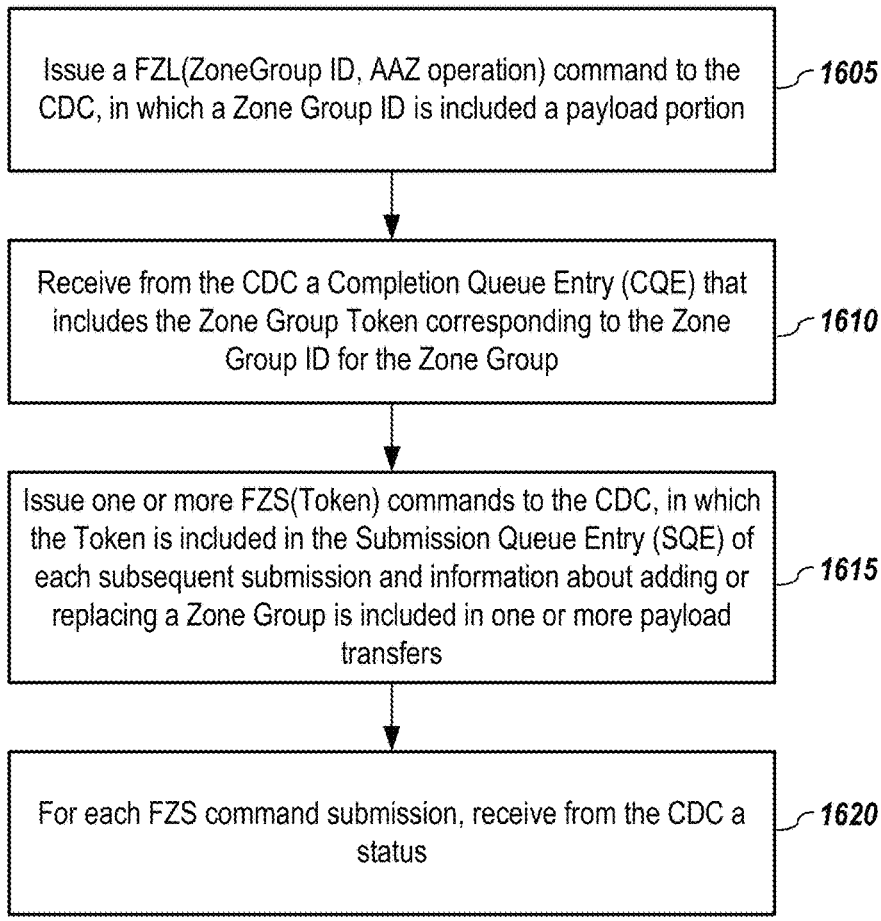
FIG. 16 depicts a method for performing an Add/Replace Active ZoneGroup (AAZ) operation, according to embodiments of the present disclosure.
Figure 17A:
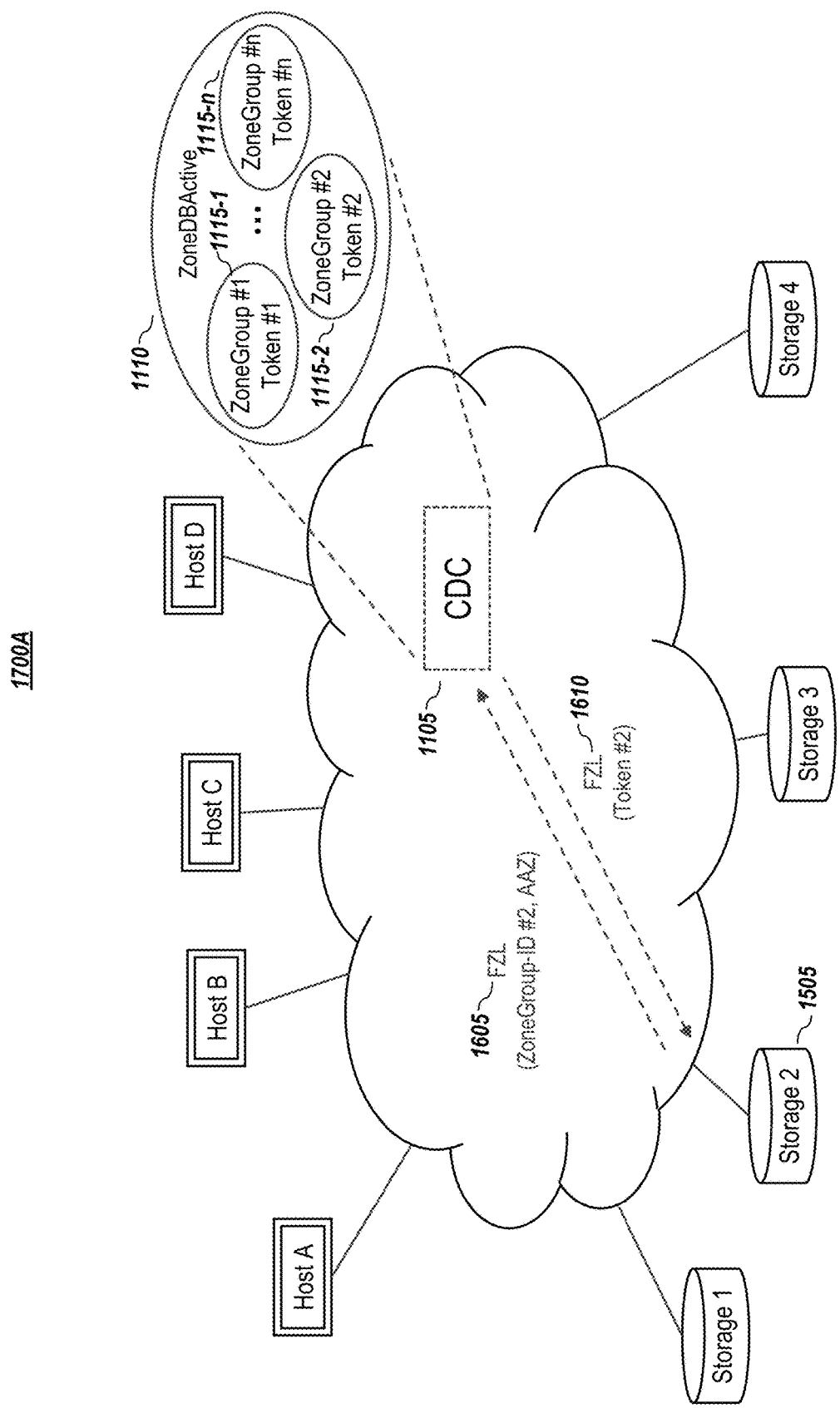
FIGS. 17A & 17B graphically depict two command processes for performing an Add/Replace Active ZoneGroup (AAZ) operation, according to embodiments of the present disclosure.
Figure 17B:
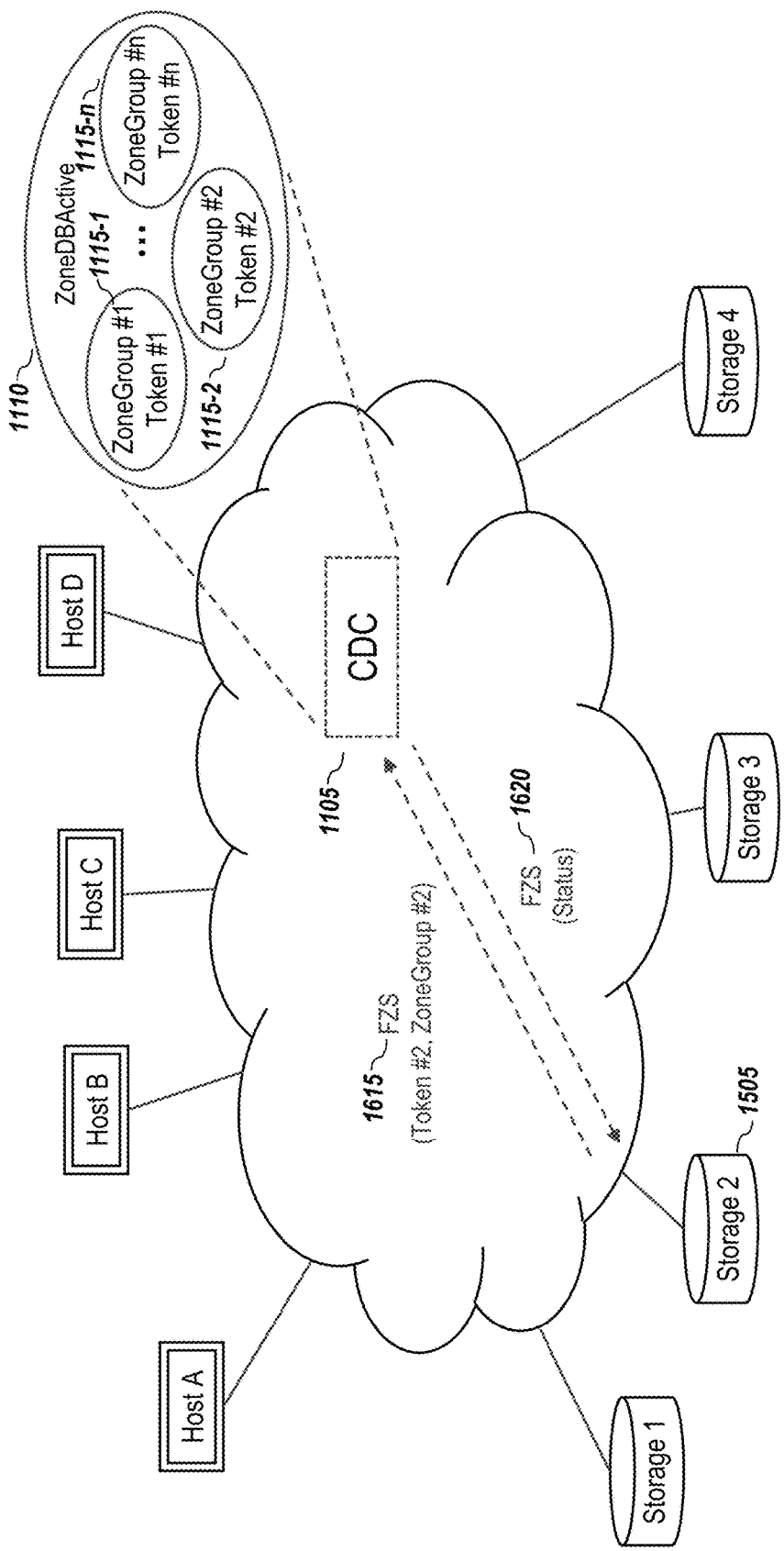

FIG. 16 depicts a method for performing an Add/Replace Active ZoneGroup (AAZ) operation, according to embodiments of the present disclosure. FIGS. 17A & 17B graphically depict two command processes for performing an Add/Replace Active ZoneGroup (AAZ) operation, according to embodiments of the present disclosure.

As shown in FIG. 16, the Add/Replace Active ZoneGroup operation commences by issuing (1605) a Fabric Zoning Lookup command, FZL (ZoneGroup ID, AAZ operation), to the discovery controller in order to retrieve a token associated with a zone group. The zone group identifier may be included in a data transfer (i.e., 2010 in FIG. 20) of the FZL command. In response to receiving the FZL command, the discovery controller identifies the corresponding token, and the storage receives (1610) a CQE from the discovery controller that includes the zone group token in the FZL response along with the command status. These two steps, 1605 and 1610 of the FZL command, are graphically depicted in FIG. 17A. Storage 2 1505 sends to the CDC 1105 a FZL command 1605 with the zone group identifier (ZoneGroup-ID #2) included. The CDC 1105 uses the zone group identifier (ZoneGroup-ID #2) and its datastore 1110 to find the corresponding token (Token #2), which it returns in the FZL response 1610.

Storage 2 1505 now has the token identifier for the zone group that will fit within a field in the SQE for a command, which can be used to complete the Add/Replace Active ZoneGroup operation.

Figure 22:
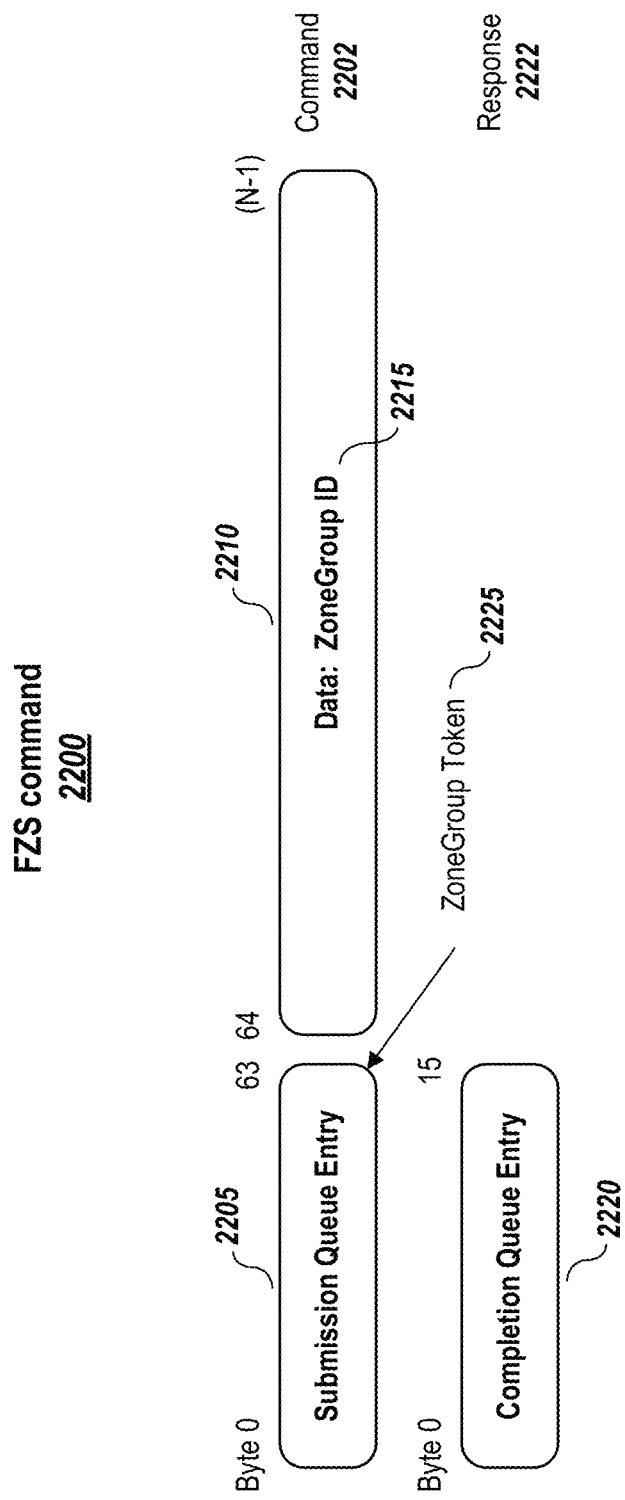
FIG. 22 graphically depicts a Fabric Zoning Send (FZS) command, according to embodiments of the present disclosure.

Referring to FIG. 16 and FIG. 17B, the storage (i.e., Storage 2) issues (1615) one or more Fabric Zoning Send (FZS) commands, FZS (Token, ZoneGroup), to the discovery controller 1105. In one or more embodiments, multiple FZS commands may be used if the zone group definition is larger than the buffer size used in these command transfers; thus, the zone group definition may then be fragmented and transferred one fragment at a time through multiple FZS commands. FIG. 22 graphically depicts a FZS command 2200, according to embodiments of the present disclosure. As illustrated, the command 2202 includes a submission queue entry (SQE) portion or submission 2205, in which the zone group token (i.e., Token #2) is included. In one or more embodiments, an indicator (e.g., a bit) in the SQE may be used to specify if the transferred zone group fragment is the last one.

For each FZS command submission, the storage receives (1620) from the discovery controller a response 2222 that comprises a CQE 2220 that includes a command status.

In one or more embodiments, the data/payload may be sent via a communication channel. In such instances, a single FZS command may be sufficient.

3. Remove Active ZoneGroup (RAZ) Operation Embodiments

Figure 18:
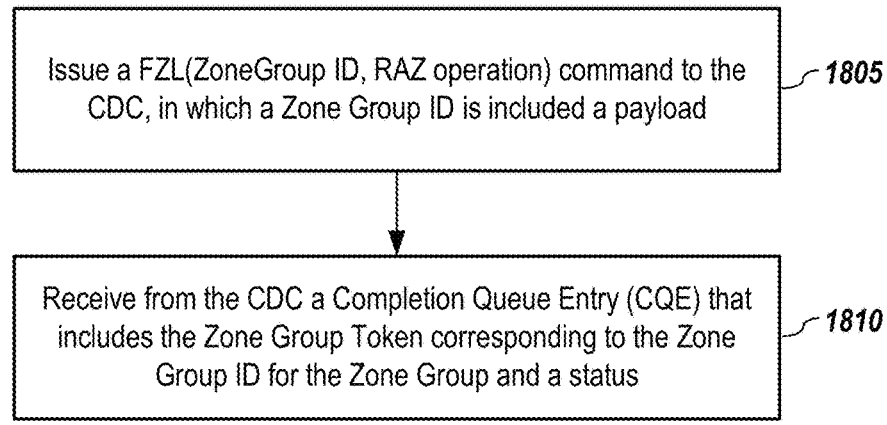
FIG. 18 depicts a method for performing a Remove Active ZoneGroup (RAZ) operation, according to embodiments of the present disclosure.
Figure 19:
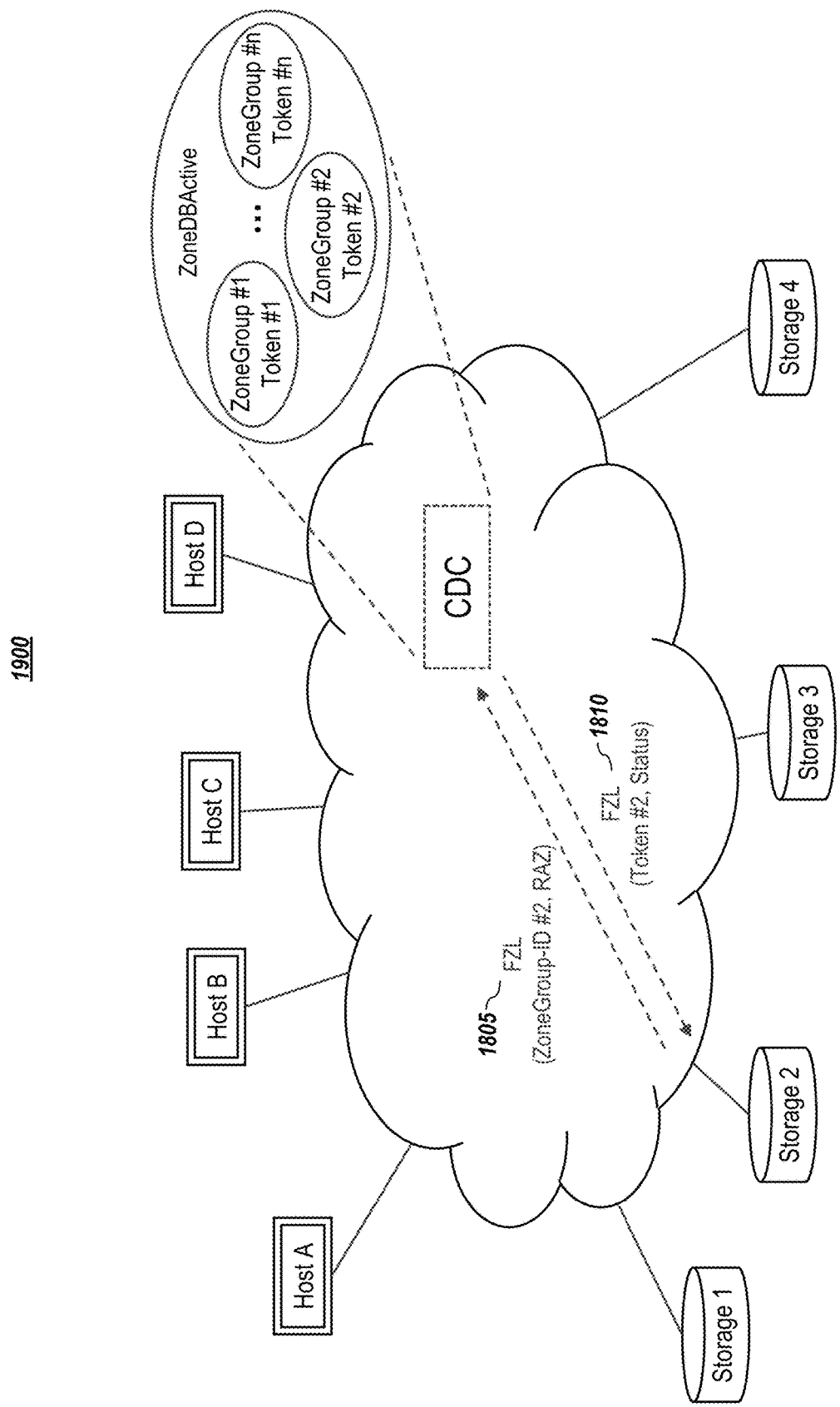
FIG. 19 graphically depicts a command process for performing a Remove Active ZoneGroup (RAZ) operation, according to embodiments of the present disclosure.

FIG. 18 depicts a method for performing a Remove Active ZoneGroup (RAZ) operation, according to embodiments of the present disclosure. FIG. 19 graphically depicts a command process for performing a Remove Active ZoneGroup (RAZ) operation, according to embodiments of the present disclosure. Note that, unlike the prior two operations, the Remove Active ZoneGroup operation may be implemented with one zoning command.

As shown in FIG. 18 and FIG. 19, the Remove Active ZoneGroup operation commences by issuing (1805) a Fabric Zoning Lookup command, FZL (ZoneGroup ID, RAZ operation) (e.g., FZL 2000 illustrated in FIG. 20), to the discovery controller to notify it to delete the identified zone group. In response to receiving the FZL command, the discovery controller identifies the corresponding token for the specified zone group, executes the delete operation, and returns the token. Thus, the storage subsystem receives (1810) a CQE that includes the zone group token in the FZL response along with a status.

As illustrated in these example embodiments, bidirectional-like operations can be facilitated to allow for subsystem-driven zoning operations through unidirectional NVMe® commands:

(1) the Get Active ZoneGroup (GAZ) operation is decomposed in two Zoning commands, one FZL (ZoneGroup ID, GAZ operation) command followed by one or more FZR (Token) commands.

(2) the Add/Replace Active ZoneGroup (AAZ) operation is decomposed in two Zoning commands, one FZL (ZoneGroup ID, AAZ operation) command followed by one or more FZS (Token) commands; and (3) the Remove Active ZoneGroup (RAZ) operation is decomposed in one Zoning commands, one FZL (ZoneGroup ID, RAZ operation) command.

These operations are facilitated by augmenting the discovery controller zone group definition with unique tokens, which may be maintained and are accessible by the discovery controller.

One skilled in the art shall recognize that other operations may also be implemented in the same or similar manner.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 23:
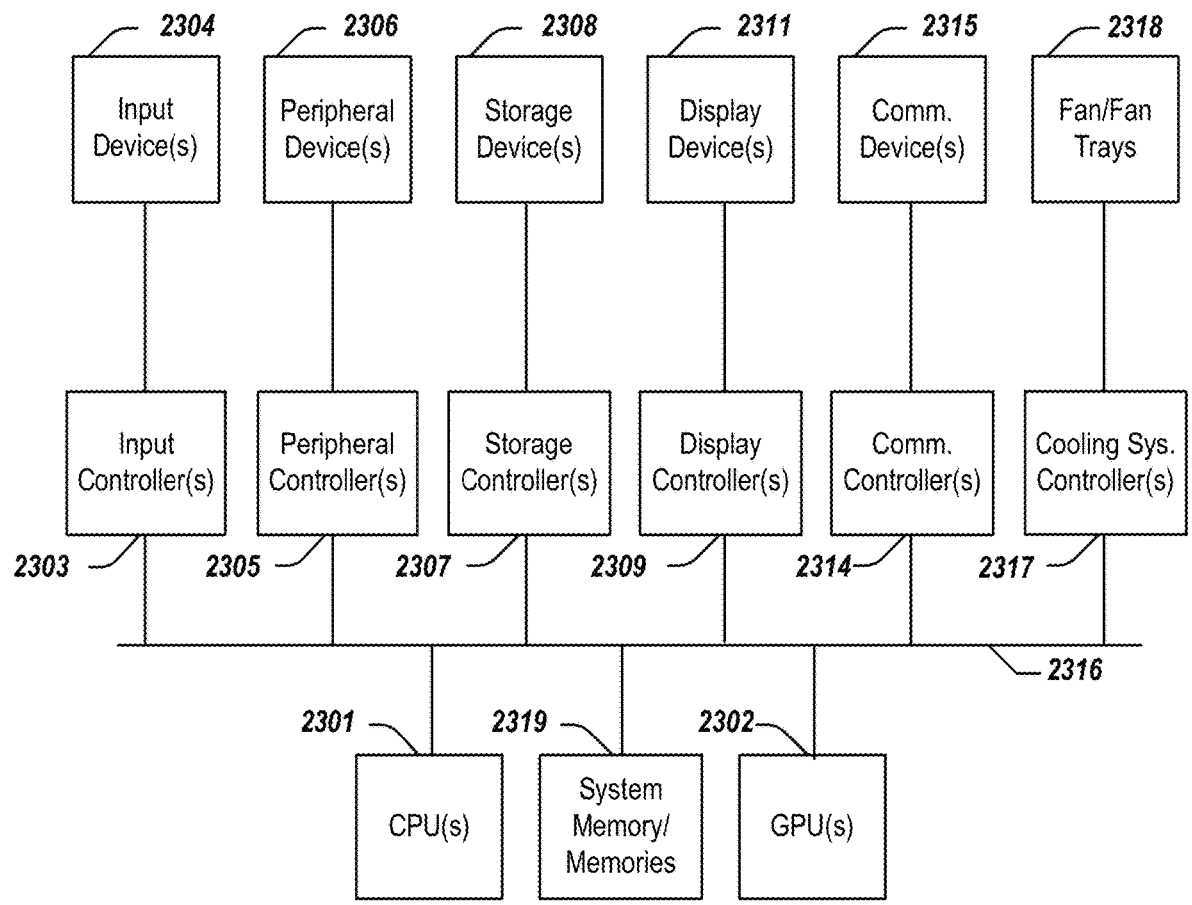
FIG. 23 depicts a simplified block diagram of an information handling system, according to embodiments of the present disclosure.

FIG. 23 depicts a simplified block diagram of an information handling system (or computing system), according to embodiments of the present disclosure. It will be understood that the functionalities shown for system 2300 may operate to support various embodiments of a computing system—although it shall be understood that a computing system may be differently configured and include different components, including having fewer or more components as depicted in FIG. 23.

As illustrated in FIG. 23, the computing system 2300 includes one or more CPUs 2301 that provides computing resources and controls the computer. CPU 2301 may be implemented with a microprocessor or the like and may also include one or more graphics processing units (GPU) 2302 and/or a floating-point coprocessor for mathematical computations. In one or more embodiments, one or more GPUs 2302 may be incorporated within the display controller 2309, such as part of a graphics card or cards. The system 2300 may also include a system memory 2319, which may comprise RAM, ROM, or both.

A number of controllers and peripheral devices may also be provided, as shown in FIG. 23. An input controller 2303 represents an interface to various input device(s) 2304, such as a keyboard, mouse, touchscreen, stylus, microphone, camera, trackpad, display, etc. The computing system 2300 may also include a storage controller 2307 for interfacing with one or more storage devices 2308 each of which includes a storage medium such as magnetic tape or disk, or an optical medium that might be used to record programs of instructions for operating systems, utilities, and applications, which may include embodiments of programs that implement various aspects of the present disclosure. Storage device(s) 2308 may also be used to store processed data or data to be processed in accordance with the disclosure. The system 2300 may also include a display controller 2309 for providing an interface to a display device 2311, which may be a cathode ray tube (CRT) display, a thin film transistor (TFT) display, organic light-emitting diode, electroluminescent panel, plasma panel, or any other type of display. The computing system 2300 may also include one or more peripheral controllers or interfaces 2305 for one or more peripherals 2306. Examples of peripherals may include one or more printers, scanners, input devices, output devices, sensors, and the like. A communications controller 2314 may interface with one or more communication devices 2315, which enables the system 2300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2300 comprises one or more fans or fan trays 2318 and a cooling subsystem controller or controllers 2317 that monitors thermal temperature(s) of the system 2300 (or components thereof) and operates the fans/fan trays 2318 to help regulate the temperature.

In the illustrated system, all major system components may connect to a bus 2316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 24:
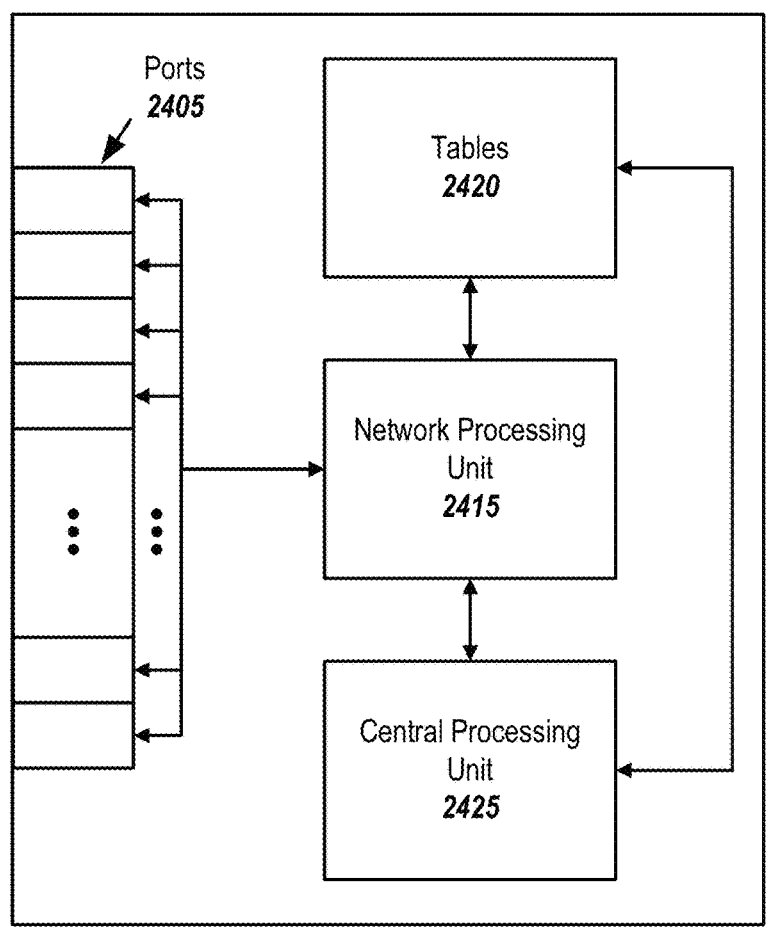
FIG. 24 depicts an alternative block diagram of an information handling system, according to embodiments of the present disclosure.

FIG. 24 depicts an alternative block diagram of an information handling system, according to embodiments of the present disclosure. It will be understood that the functionalities shown for system 2400 may operate to support various embodiments of the present disclosure—although it shall be understood that such system may be differently configured and include different components, additional components, or fewer components.

The information handling system 2400 may include a plurality of I/O ports 2405, a network processing unit (NPU) 2415, one or more tables 2420, and a CPU 2425. The system includes a power supply (not shown) and may also include other components, which are not shown for sake of simplicity.

In one or more embodiments, the I/O ports 2405 may be connected via one or more cables to one or more other network devices or clients. The network processing unit 2415 may use information included in the network data received at the node 2400, as well as information stored in the tables 2420, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various processor/computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A processor-implemented method comprising:
   accessing, by a controller, a zoning datastore that correlates a zone group token and a zone group identifier to a zone group, in which the zone group comprises one or more hosts that are authorized to access data of one or more storage subsystems; and
   supporting a set of zone-related commands comprising one or more of:
      a zone lookup command, in which the controller returns, responsive to receiving a command that comprises a zone group identifier associated with a zone group, a response comprising a zone group token corresponding to the zone group identifier, in which the zone group token is in a completion queue entry portion of the response;
      a zone receive command, in which the controller returns, responsive to receiving a command that comprises a zone group token associated with a zone group, a response which comprises a zone group definition of the zone group; and
      a zone send command, in which the controller returns, responsive to receiving a command that comprises a zone group token associated with a zone group, a response which comprises a status of the zone group.

2. The processor-implemented method of claim 1 wherein, for the zone lookup command, the zone group token has a memory size that fits within the completion queue entry portion of the response.

3. The processor-implemented method of claim 1 wherein, for the zone receive command, the zone send command, or both, the zone group token is used in a submission queue entry portion of the command.

4. The processor-implemented method of claim 1 wherein the controller provides information about a zone group in a response by performing steps comprising:
   responding to a zone lookup command, wherein the controller uses a zone group identifier received as part of the zone lookup command to identify a corresponding zone group token based upon information in the zoning datastore and provides the corresponding zone group token in the response; and
   responding to a zone receive command that included the zone group token, wherein the controller returns a definition of a zone group that corresponds to the zone group token.

5. The processor-implemented method of claim 1 wherein the controller helps facilitate adding or changing of a zone group by performing steps comprising:
   responding to a zone lookup command, wherein the controller uses a zone group identifier received as part of the zone lookup command to identify a corresponding zone group token based upon information in the zoning datastore and provides the corresponding zone group token in the response; and
   responding to a zone send command that included the zone group token, wherein the controller returns at least a status of the zone group that corresponds to the zone group token.

6. The processor-implemented method of claim 1 wherein the controller helps facilitate removing of a zone group by performing steps comprising:
   responding to a zone lookup command that was a delete operation and that includes an identifier that identifies the zone group to be deleted, wherein the controller provides at least a status of the zone group.

7. An information handling system comprising:
   one or more processors; and
   a non-transitory computer-readable medium or media comprising one or more sets of instructions which, when executed by at least one of the one or more processors, supports operation a set of zone-related commands comprising one or more of:
      a zone lookup command that, when transmitted to a controller:
         comprises a zone group identifier associated with a zone group; and
         causes the controller to return a response, which comprises a zone group token in a completion queue entry portion of the response that corresponds to the zone group identifier;
      a zone receive command that, when transmitted to a controller:
         comprises a zone group token associated with a zone group; and
         causes the controller to return a response, which comprises a zone group definition for the zone group; and
      a zone send command that, when transmitted to a controller:
         comprises a zone group token associated with a zone group; and
         causes the controller to return a response, which comprises a status associated with the zone group.

8. The information handling system of claim 7 wherein, for the zone lookup command, the zone group token that is included in the completion queue entry portion of the response has a memory size that fits within the completion queue entry portion of the response.

9. The information handling system of claim 7 wherein, for the zone receive command, the zone send command, or both the zone group token is used in a submission queue entry portion of the command.

10. The information handling system of claim 7 wherein the information handling system obtains zone information about a zone group from a controller by utilizing:
   a zone lookup command, wherein the controller provides a zone group token for a zone group; and a zone receive command that included the zone group token, wherein the controller returns at least a definition of the zone group.

11. The information handling system of claim 7 wherein the information handling system adds or changes information managed by a controller by utilizing:
a zone lookup command, wherein the controller provides a zone group token for a zone group; and
a zone send command that included the zone group token and information about an add or change.

12. The information handling system of claim 7 wherein the information handling system causes a zone group to be removed from information managed by a controller by utilizing:
a zone lookup command as a delete operation, wherein the controller provides a zone group token for a zone group, a status of the zone group, or both.

13. A processor-implemented method comprising:
for a zone group, maintaining a datastore that correlates a token to a zone group identifier for the zone group, in which a zone group represents a set of one or more hosts that are allowed to access data of one or more storage subsystems;
wherein the token is sized to fit within a memory constraint of a completion queue entry portion of a response to a command.

14. The processor-implemented method of claim 13 further comprising:
responsive to receiving a zone lookup command comprising a zone group identifier for a zone group:
using the zone group identifier to obtain a token corresponding to the zone group identifier for the zone group; and
returning the token for the zone group in a completion queue entry portion of a response.

15. The processor-implemented method of claim 14 further comprising:
responsive to the zone lookup command not being a remove zone group operation, receiving one or more subsequent commands comprising a submission queue entry that comprises the token to identify the zone group.

16. The processor-implemented method of claim 14 wherein the step of using the zone group identifier to obtain a token corresponding to the zone group identifier for the zone group comprises:
using the zone group identifier to look up the corresponding token in the datastore.

17. The processor-implemented method of claim 16 further comprising:
responsive to the datastore not having a token corresponding to the zone group identifier for the zone group:
generating a token for the zone group; and
associating the token with the zone group identifier or zone group in the datastore.

18. The processor-implemented method of claim 14 wherein:
the zone lookup command is a first command of a plurality of commands that form an operation to obtain information about the zone group from a discovery controller; and
one or more subsequent commands are a receive command or commands that cause the discovery controller to return the information about the zone group.

19. The processor-implemented method of claim 14 wherein:
the zone lookup command is a first command of a plurality of commands that form an operation to create or make a change to the zone group; and
one or more subsequent commands are a send command or commands that cause a discovery controller to add the zone group to the datastore maintained by the discovery controller or to make a change to the zone group.

20. The processor-implemented method of claim 14 further comprising:
given the zone group being indicated as being locked, unlocking the zone group after receiving at least one of one or more subsequent commands that comprise a submission queue entry that includes the token that identifies the zone group.

* * * * *